US012760812B2

(12) United States Patent
Qiu et al.

(10) Patent No.: US 12,760,812 B2
(45) **Date of Patent: *Oct. 13, 2026**

(54) SINGLE COUPLED VALVE BODY OF FAUCET

(71) Applicant: Wenzhou Furuisi Building Materials Co., Ltd., Wenzhou (CN)

(72) Inventors: Chunhe Qiu, Wenzhou (CN); Qingkui An, Wenzhou (CN)

(73) Assignee: Wenzhou Furuisi Building Materials Co., Ltd., Wenzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/328,107

(22) Filed: Sep. 13, 2025

(65) Prior Publication Data

US 2026/0009474 A1 Jan. 8, 2026

Related U.S. Application Data

(63) Continuation of application No. 18/982,595, filed on Dec. 16, 2024, now Pat. No. 12,435,806, which is a continuation-in-part of application No. 18/805,750, filed on Aug. 15, 2024, now Pat. No. 12,281,715, which is a continuation-in-part of application No. 18/613,285, filed on Mar. 22, 2024, now Pat. No. 12,146,578, which is a continuation of application No. 18/415,891, filed on Jan. 18, 2024, now Pat. No. 12,013,045, which is a continuation-in-part of application No. PCT/CN2023/126410, filed on Oct. 25, 2023.

(30) Foreign Application Priority Data

Aug. 25, 2022 (CN) ......................... 202222247154.3
May 11, 2023 (CN) ......................... 202321129372.5

(51) Int. Cl.
*F16K 11/00* (2006.01)
*E03C 1/04* (2006.01)

(52) U.S. Cl.
CPC .......... *F16K 19/006* (2013.01); *E03C 1/0403* (2013.01)

(58) Field of Classification Search
CPC ........ F16K 19/006; F16K 27/00; F16K 27/10; E03C 1/0402; E03C 1/0403
See application file for complete search history.

(56) References Cited

U.S. PATENT DOCUMENTS 12,013,045 B2 * 6/2024 An ......................... F16K 19/006
12,054,926 B1 * 8/2024 Ding ..................... E03C 1/0412
12,116,759 B1 * 10/2024 Ding ..................... E03C 1/0412
12,281,715 B2 * 4/2025 An ......................... F16K 19/006
(Continued)

*Primary Examiner* — Reinaldo Sanchez-Medina

(57) ABSTRACT

A valve body of a faucet includes a body, a water outlet pipe, and a mounting component configured to housing the body. The mounting component defines a hollow cavity surrounding an outer surface of the body, the body defines a first water inlet channel and a first water outlet channel, both of the first water inlet channel and the first water outlet channel are in communication with the hollow cavity. The water outlet pipe is extended from the body, the water outlet pipe comprises a second water outlet channel communicated with the first water outlet channel, both of the body and the water outlet pipe are made of plastic, and the body and the water outlet pipe are integrally disposed.

19 Claims, 26 Drawing Sheets

(56) References Cited

U.S. PATENT DOCUMENTS

| | | | | |
|---|---|---|---|---|
| 12,435,806 | B2 * | 10/2025 | An | E03C 1/0401 |
| 2009/0256348 | A1 * | 10/2009 | Bors | F16L 37/144<br>285/12 |
| 2011/0073205 | A1 * | 3/2011 | Marty | E03C 1/0403<br>137/801 |
| 2023/0021010 | A1 * | 1/2023 | Li | E03C 1/0402 |

* cited by examiner

SINGLE COUPLED VALVE BODY OF FAUCET

CROSS-REFERENCE TO RELATED APPLICATION

The present disclosure is a continuation of U.S. patent application Ser. No. 18/982,595 filed on Dec. 16, 2024, titled "SINGLE COUPLED VALVE BODY OF FAUCET", while U.S. patent application Ser. No. 18/982,595 is a continuation-in-part of U.S. patent application Ser. No. 18/805,750 filed on Aug. 15, 2024, titled "SINGLE COUPLED VALVE BODY OF FAUCET". And the U.S. patent application Ser. No. 18/805,750 is a continuation-in-part of U.S. patent application Ser. No. 18/613,285, filed on Mar. 22, 2024, titled "SINGLE COUPLED VALVE BODY OF FAUCET". Further, the U.S. patent application Ser. No. 18/613,285 is a continuation of U.S. patent application Ser. No. 18/415,891, filed on Jan. 18, 2024, titled "SINGLE COUPLED VALVE BODY OF FAUCET". The U.S. patent application Ser. No. 18/415,891 further claims foreign priority to International Patent Application No. PCT/CN2023/126410, filed on Oct. 25, 2023, titled "SINGLE COUPLED VALVE BODY OF FAUCET", claims foreign priority to Chinese Patent Application No. CN202222247154.3, filed on Aug. 25, 2022, titled "SINGLE COUPLED VALVE BODY OF FAUCET", and claims foreign priority to Chinese Patent Application No. CN202321129372.5, filed on May 11, 2023, titled "SINGLE COUPLED VALVE BODY OF FAUCET".

TECHNICAL FIELD

The present disclosure relates to a field of faucets, and in particular to a valve body of a faucet.

BACKGROUND

In the prior art, faucets are divided into single coupled faucets, double coupled faucets, triple coupled faucets, etc. A faucet valve body of a conventional single coupled faucet is generally made of metal such as copper, which is costly.

In addition, the faucet valve body made of the metal such as copper often needs to be welded to a water outlet pipe during an assembly process, making a processing technology thereof complex, resulting in increase in processing costs.

It should also be noted that faucet valve body made of the metal such as copper is heavy, which further increases transportation costs.

SUMMARY

A valve body of a faucet includes a body, a water outlet pipe, and a mounting component configured to housing the body. The mounting component defines a hollow cavity surrounding an outer surface of the body, the body defines a first water inlet channel and a first water outlet channel, both of the first water inlet channel and the first water outlet channel are in communication with the hollow cavity. The water outlet pipe is extended from the body, the water outlet pipe comprises a second water outlet channel communicated with the first water outlet channel, both of the body and the water outlet pipe are made of plastic, and the body and the water outlet pipe are integrally disposed.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

For a complete understanding of the present disclosure and its characteristics, the following description will be made in conjunction with the accompanying drawings, where same reference numbers in the following description indicate same structures.

DETAILED DESCRIPTION

Figure 1:
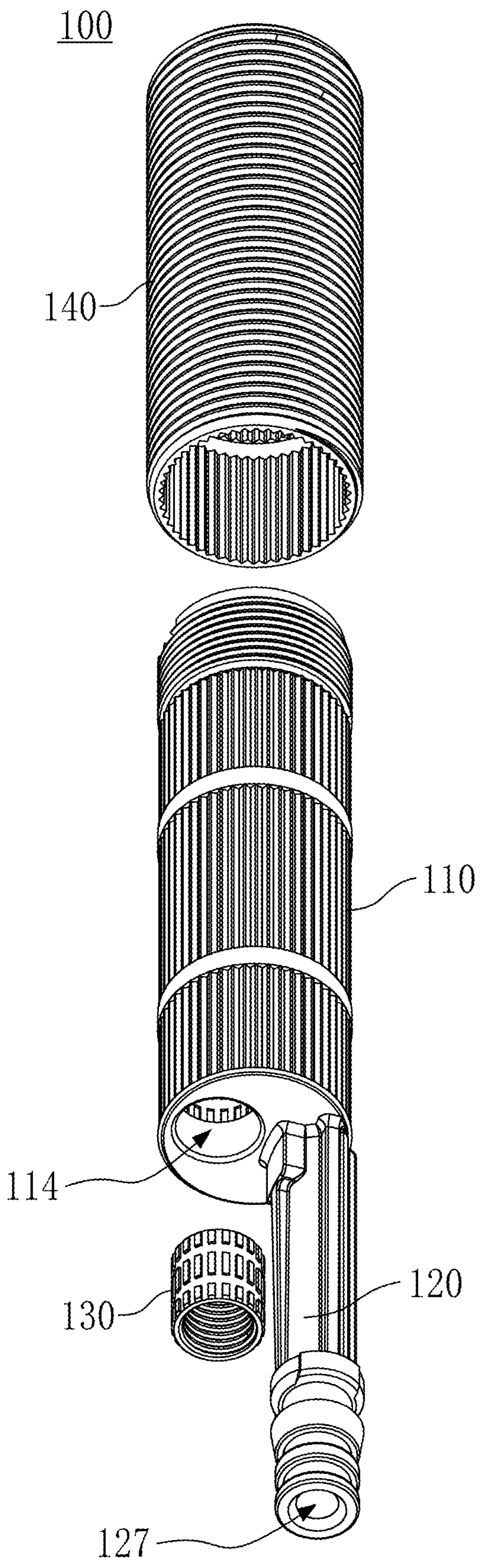
FIG. 1 is an exploded schematic diagram of a single coupled valve body of a faucet according to a first embodiment of the present disclosure.
Figure 2:
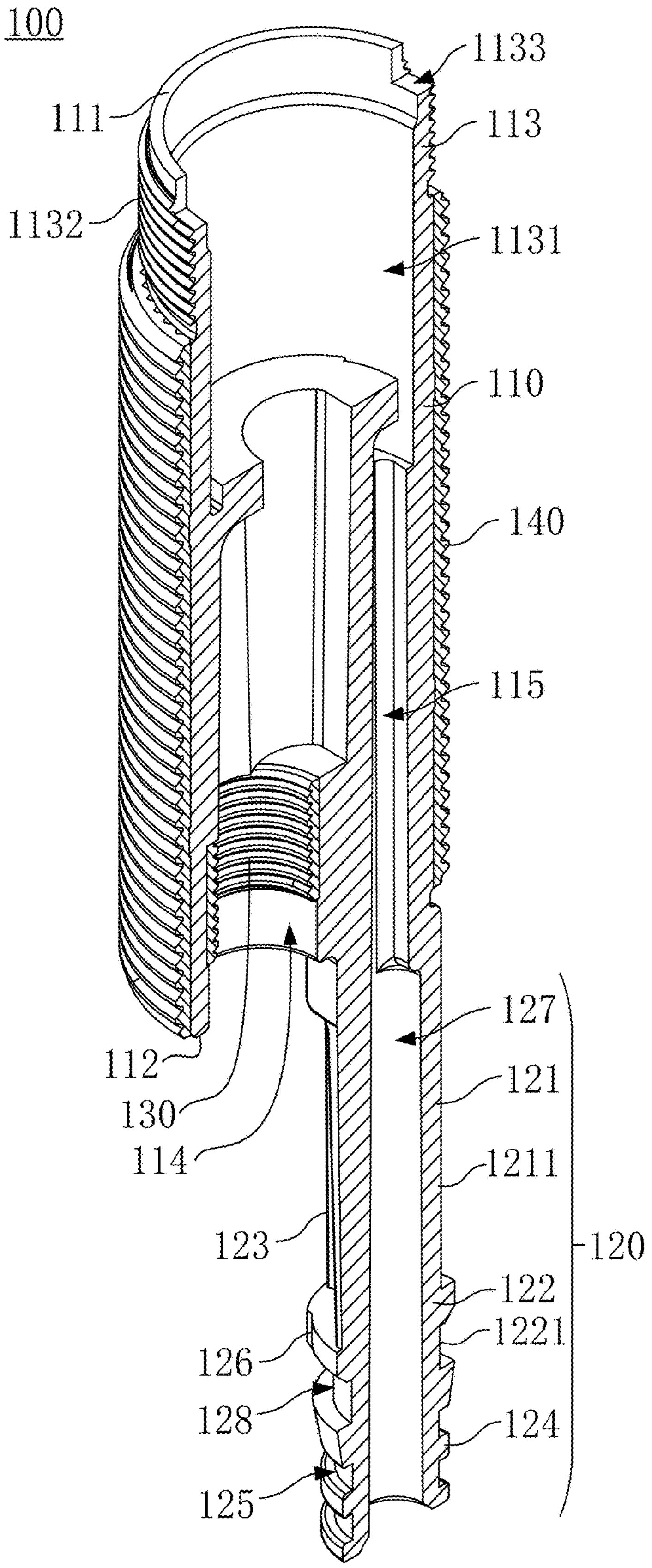
FIG. 2 is a cross-sectional schematic diagram of the single coupled valve body of the faucet according to the first embodiment of the present disclosure.
Figure 3:
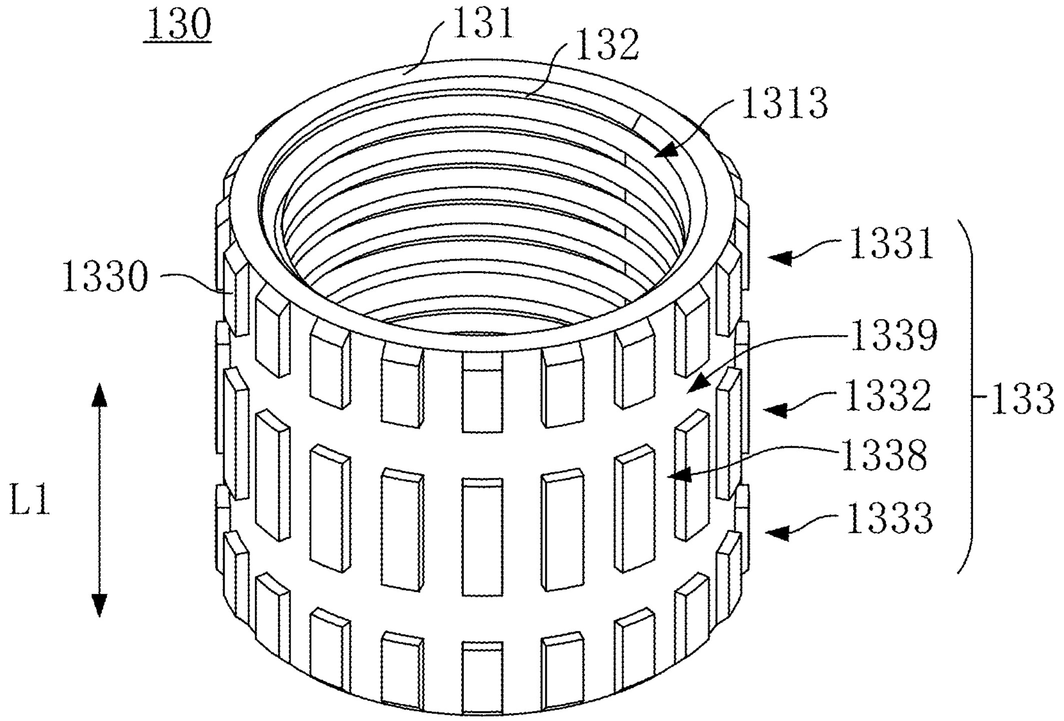
FIG. 3 is a perspective schematic diagram of a water inlet pipe connecting component of the single coupled valve body of the faucet according to the first embodiment of the present disclosure.
Figure 4:
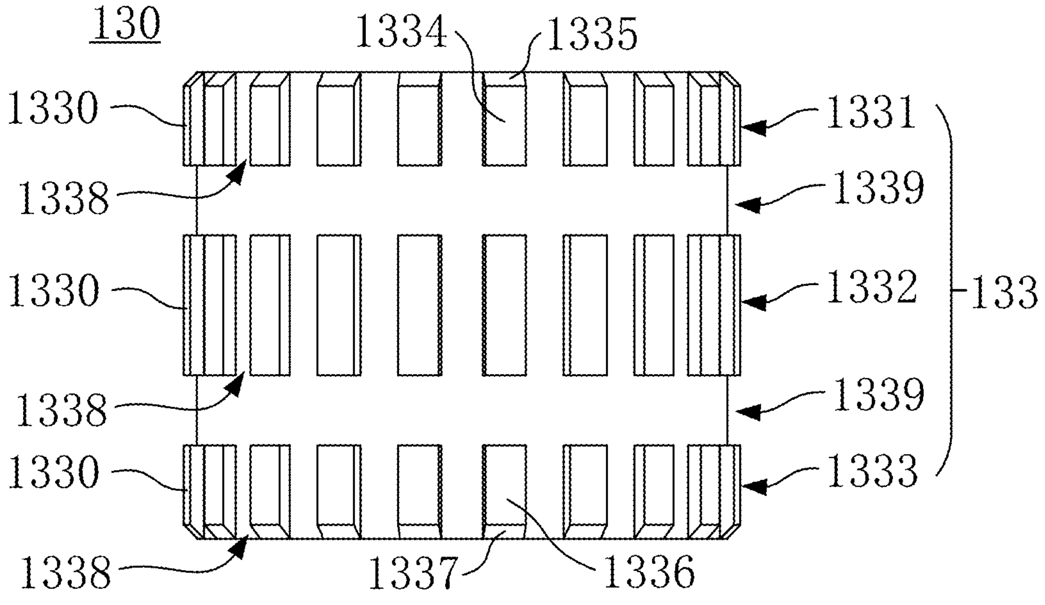
FIG. 4 is a cross-sectional schematic diagram of the water inlet pipe connecting component of the single coupled valve body of the faucet according to the first embodiment of the present disclosure.
Figure 5:
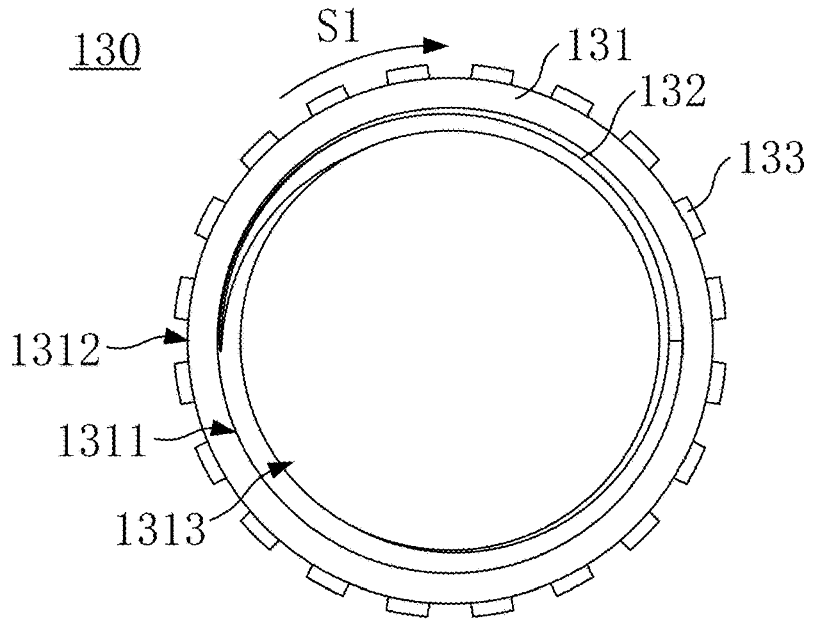
FIG. 5 is a top plan schematic diagram of the water inlet pipe connecting component of the single coupled valve body of the faucet according to the first embodiment of the present disclosure.
Figure 6:
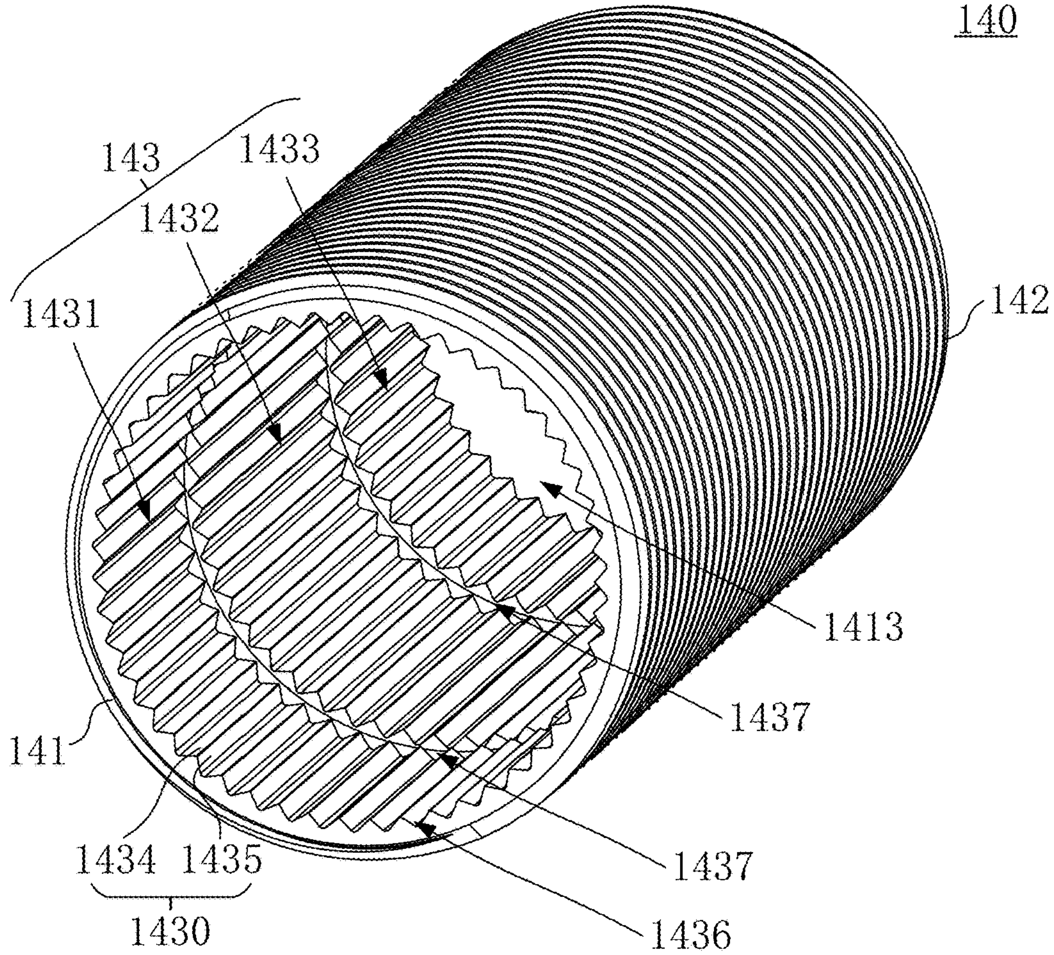
FIG. 6 is a perspective schematic diagram of a mounting component of the single coupled valve body of the faucet according to the first embodiment of the present disclosure.
Figure 7:
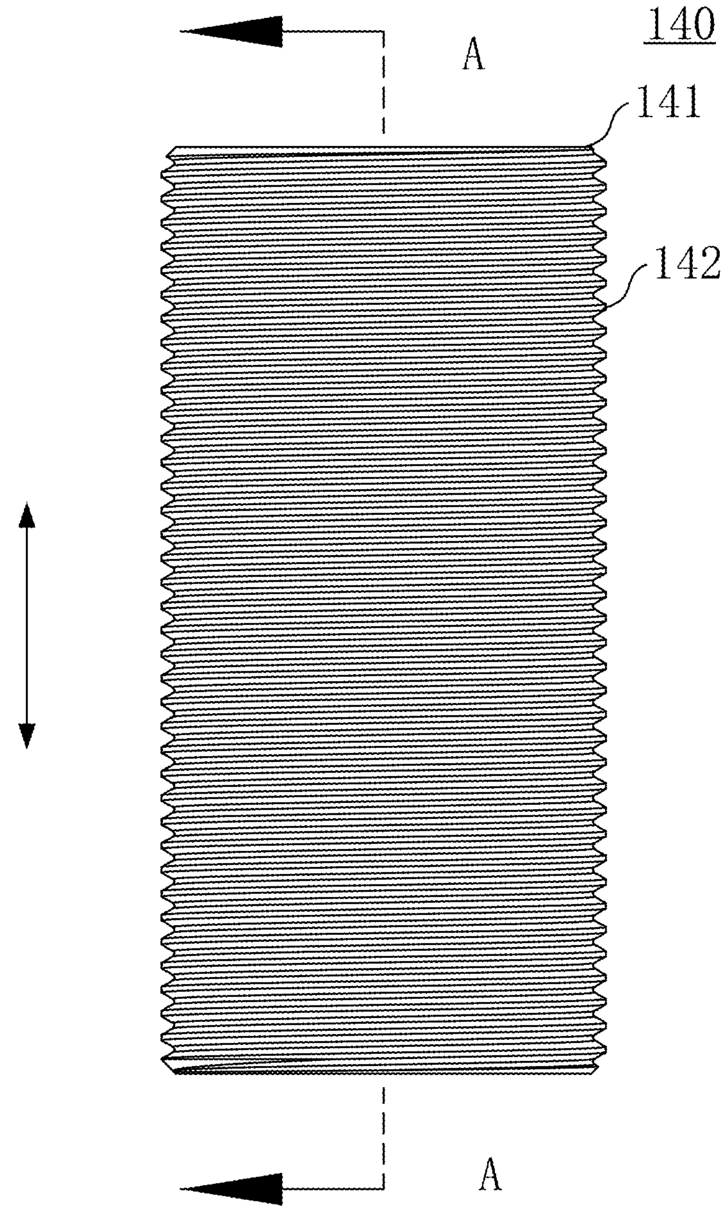
FIG. 7 is a side schematic diagram of the mounting component of the single coupled valve body of the faucet according to the first embodiment of the present disclosure.
Figure 8:
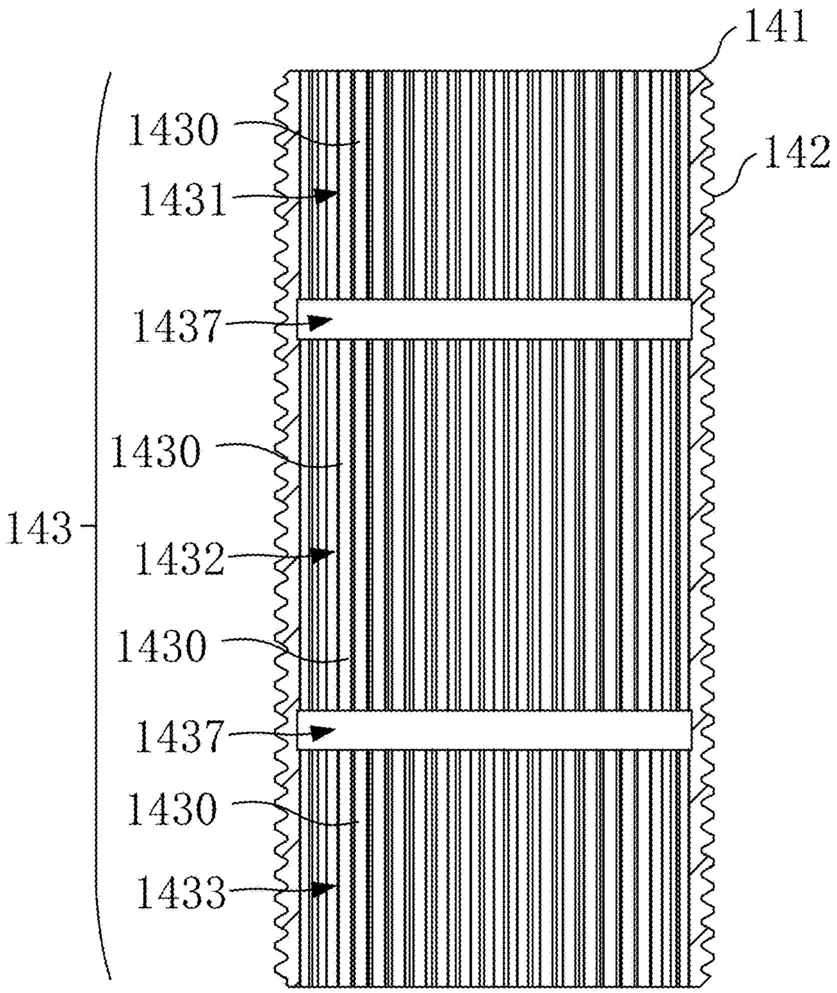
FIG. 8 is a cross-sectional schematic diagram of the mounting component taken along the line A-A shown in FIG. 7.
Figure 9:
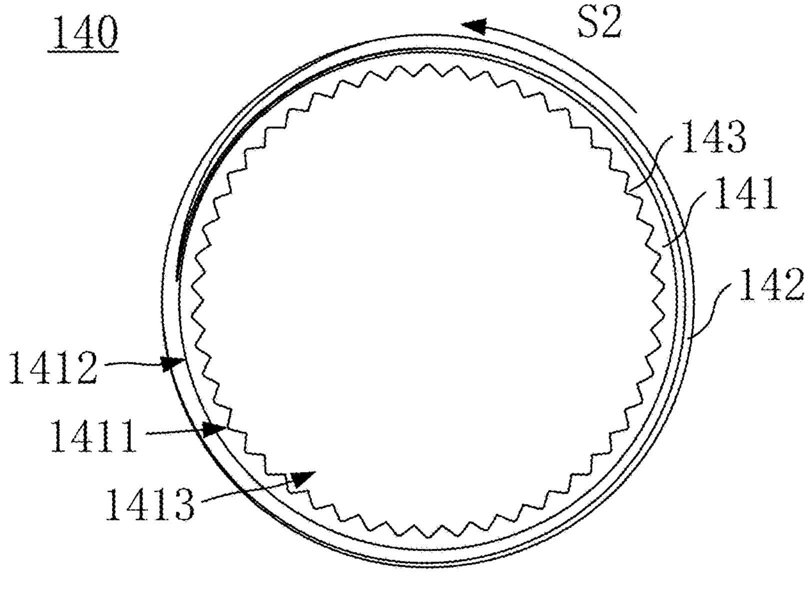
FIG. 9 is a top plan schematic diagram of the mounting component of the single coupled valve body of the faucet according to the first embodiment of the present disclosure.
Figure 10:
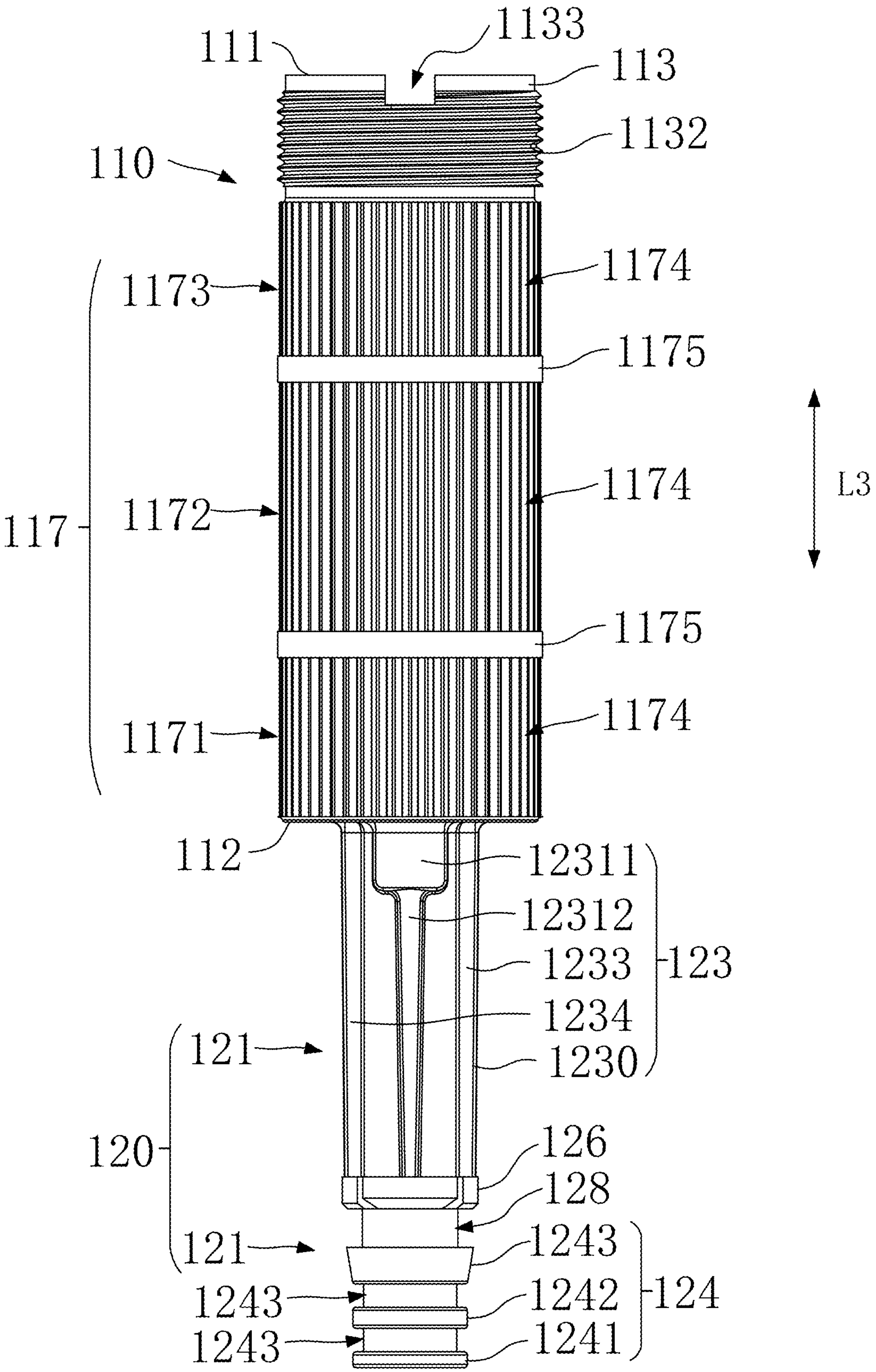
FIG. 10 is a schematic diagram of the faucet body and a water outlet pipe of the single coupled valve body of the faucet according to the first embodiment of the present disclosure.
Figure 11:
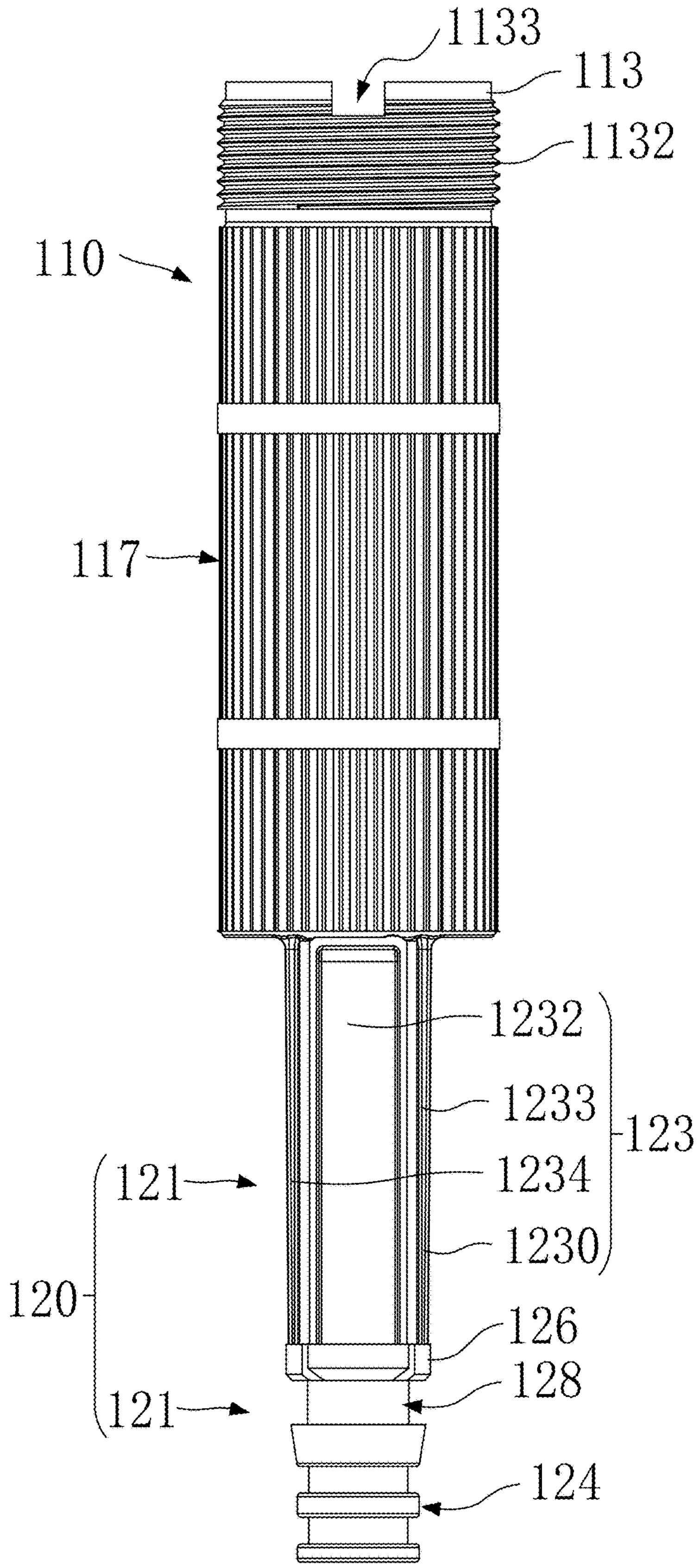
FIG. 11 is another schematic diagram of the faucet body and the water outlet pipe of the single coupled valve body of the faucet according to the first embodiment of the present disclosure.
Figure 12:
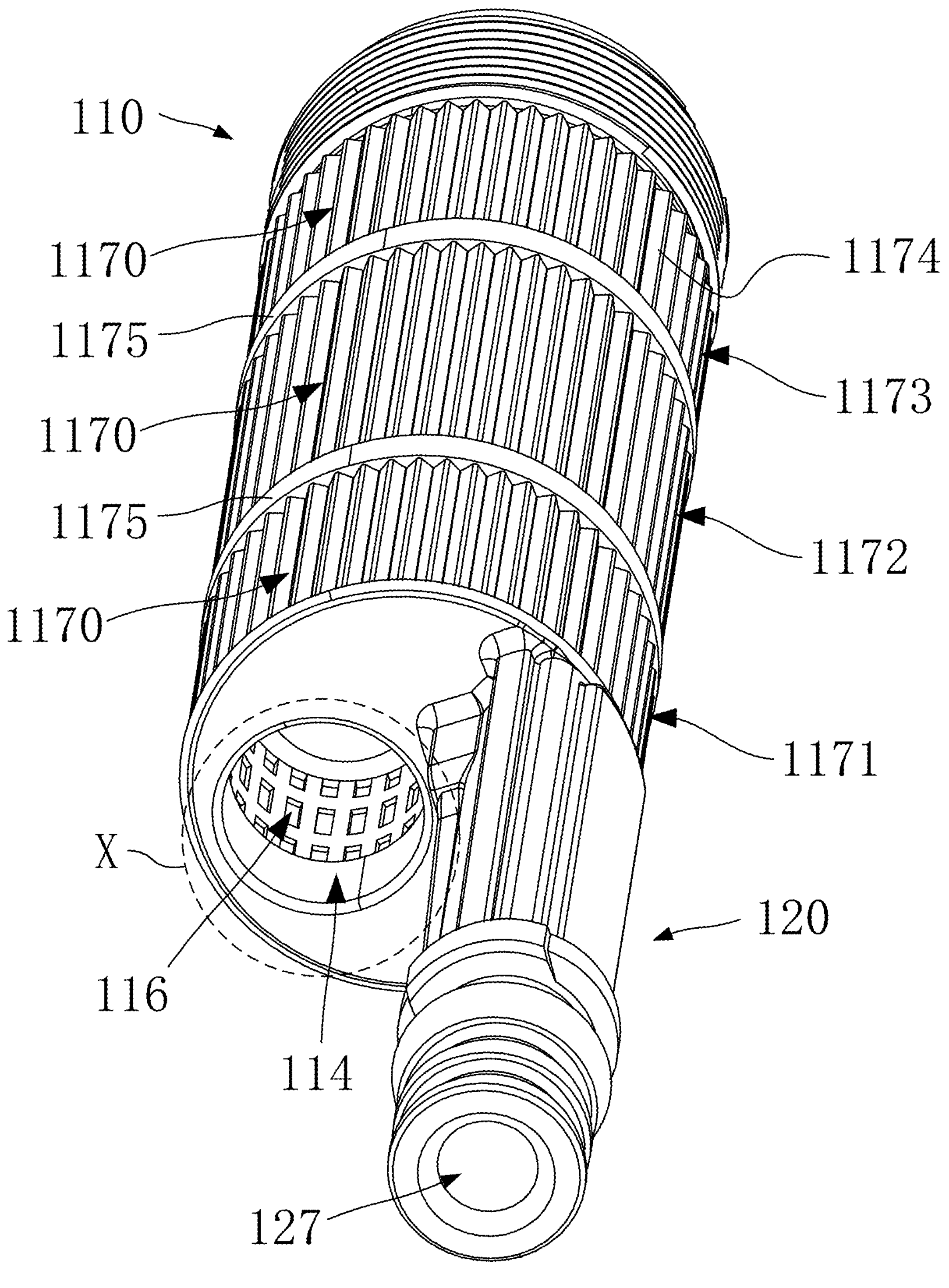
FIG. 12 is another schematic diagram of the faucet body and the water outlet pipe of the single coupled valve body of the faucet according to the first embodiment of the present disclosure.
Figure 13:
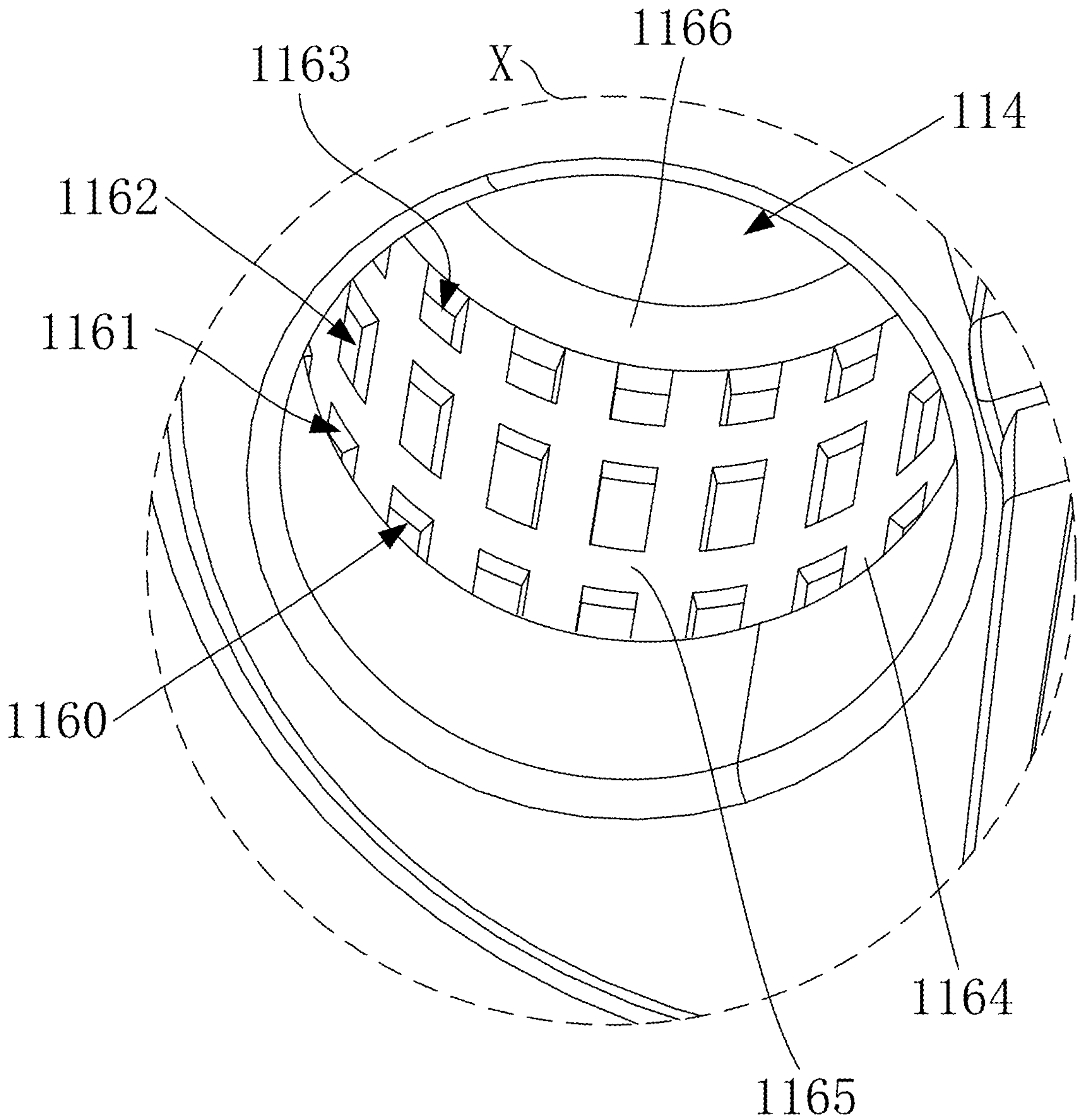
FIG. 13 is an enlarged schematic diagram of portion X shown in FIG. 12.

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. The following description of at least one exemplary embodiment is merely illustrative and is in no way intended as any limitation on the present disclosure, disclosures thereof, and use thereof. Based on the embodiments of the present disclosure, all other embodiments obtained by those of ordinary skill in the art without creative work shall fall within the protection scope of the present disclosure.

Reference herein to "embodiment" or "implement" means that a particular feature, structure, or characteristic described in connection with one embodiment or one implement may be comprised in at least one embodiment of the present disclosure. The appearances of the "embodiment" in various positions in the specification are not necessarily referring to the same embodiment, and are not independent or alternative embodiments mutually exclusive of other embodiments. Those skilled in the art explicitly and implicitly understand that the embodiments described herein may be combined with other embodiments.

As shown in FIGS. 1-13, the present disclosure provides a single coupled valve body of a faucet. The single coupled valve body 100 comprises a faucet body 110, a water outlet pipe 120, and a water inlet pipe connecting component 130. Both of the faucet body 110 and the water outlet pipe 120 are made of plastic. Compared with a conventional faucet valve body casting from metal such as copper in the prior art, the single coupled valve body 100 in the embodiment of the present disclosure reduces costs, reduces weight, and facilitate transportation.

The faucet body 110 and the water outlet pipe 120 are integrally disposed. For instance, the faucet body 110 and the water outlet pipe 120 are integrally formed by injection molding. The faucet body 110 and the water outlet pipe 120 are integrally disposed to ensure that the single coupled valve body 100 has a certain strength to a certain extent. Compared with the conventional single coupled facet valve body in the prior art in which a faucet body and a water outlet pipe are connected by welding, the faucet body 110 and the water outlet pipe 120 of the embodiment of the present disclosure are integrally designed, and costs are reduced to a certain extent.

The faucet body 110 has a top surface 111 and a bottom surface 112 opposite to each other. The faucet body 110 defines a length direction L3, and the length direction L3 of the faucet body 110 is understood as a direction of the top surface 111 of the faucet body 110 facing the bottom surface 112 thereof, or is understood as a direction of the bottom surface 112 of the faucet body 110 facing the top surface 111 thereof.

A valve core mounting groove 1131 is defined on the top surface 111 of the faucet body 110. The faucet body 110 defines a water inlet channel 114 and a first water outlet channel 115. The water inlet channel 114 and the first water outlet channel 115 are communicated with the valve core mounting groove 113 and penetrate the top surface 111 and the bottom surface 112 of the faucet body 110. The valve core mounting groove 1131 is configured to mount a valve core.

The faucet body 110 comprises a valve core mounting wall 113 disposed around the valve core mounting groove 1131. Valve core mounting outer threads 1132 are disposed on an outer surface of the valve core mounting wall 113. The valve core is mounted in the valve core mounting groove 1131 and is limited by the valve core mounting wall 113. The valve core is sleeved in the valve core mounting groove through a fastening component, and the fastening component is connected to the valve core mounting outer threads 1132 to fasten the valve core.

In order to further enhance a limiting effect of the valve core mounting wall 113 on the valve core, one end of the valve core mounting wall 113 away from the water outlet pipe 120 defines at least one mounting notch 1133. In the embodiment of the present disclosure, two mounting notches 1133 are taken as examples for illustration, and the two mounting notches 1133 are oppositely defined on the valve core mounting wall 113. It should be noted that the one end of the valve core mounting wall 113 away from the water outlet pipe 120 is understood as a free end of the valve core mounting wall 113 or a top end of the valve core mounting wall 113.

The valve core mounting wall 113 is served as a portion of the faucet body, the valve core mounting wall 113 is made of the plastic, and the valve core mounting outer threads 1132 are made of the plastic. It is understood that after the single coupled valve body 100 is processed and formed, the valve core is mounted in the valve core mounting groove 1131 in a factory. During an actual assembly process, the valve core is assembled automatically by machinery or assembled by professional assembly workers.

Regardless of whether the valve core is assembled automatically by machinery or assembled by the professional assembly workers, during the actual assembly process, the valve core mounting wall 113 made of the plastic and the valve core mounting outer threads 1132, made of the plastic, on the valve core mounting wall 113 are not easily damaged.

It is understood that in a process of mounting the single coupled valve body, a user needs to mount and fix the single coupled valve body 100 to a predetermined position, and connect the water inlet channel 114 of the single coupled valve body 100 with an external water inlet pipe. For instance, the water inlet channel 114 of the single coupled valve body 100 is connected to the external water inlet pipe Considering different mounting requirements of the user, in the embodiment of the present disclosure, the water inlet pipe connecting component 130, made of metal such as copper, is disposed in the water inlet channel 114. The water inlet pipe connecting component 130 made of the metal is connected to the external water inlet pipe. Compared with plastic material, a strength of the water inlet pipe connecting component 130 made of the metal is large, so the water inlet pipe connecting component 130 is not easy to damage during assembly.

It should be noted that the metal used by the water inlet pipe connecting component 130 is not limited to copper, and the metal may be stainless steel.

The water inlet pipe connecting component 130 comprises a connecting ring 131 and connecting threads 132. The connecting ring 131 and the connecting threads 132 are made of the metal. The connecting ring 131 and the connecting threads 132 are integrally disposed. The connecting ring 131 is hollow. The connecting threads 132 are disposed on an inner surface 1311 of the connecting ring 131. The connecting threads are at least partially located in the water inlet channel 114. The external water inlet pipe is extendable into the water inlet channel 114 to screw with the connecting threads 132.

In the embodiment of the present disclosure, a portion of the single coupled valve body 100 connected to the external water inlet pipe (i.e., the connecting threads 132) is made of the metal, such as copper, which increases a strength compared with the plastic. Especially, in the actual mounting process, the connecting threads made of the metal is hardly damaged, and stability of the single coupled valve body 100 and the external water inlet pipe is ensured to a certain extent.

The connecting ring 131 is at least partially embedded in the faucet body 110. In order to increase connection stability of the connecting ring 131 and the faucet body 110, the connecting ring 131 of the embodiment of the present disclosure is completely embedded in the faucet body 110 without protruding into the water inlet channel 114. For instance, the connecting ring 131 is defined in a mold and is injection-molded by the plastic, then the faucet body 110 and the water outlet pipe 120 are formed, the connecting ring 131 is embedded in the faucet body 110, and the connecting threads 132 are located in the water inlet channel 114. According to the embodiments of the present disclosure, the connection stability of the connecting ring 131 and the faucet body 110 is increased to a certain extent.

In order to ensure stability after the connecting ring 131 is embedded in the faucet body 110, a thickness of the connecting ring 131 in the embodiment of the present disclosure is not less than 1 mm. For instance, the thickness of the connecting ring 131 is 1-1.5 mm, such as 1 mm, 1.2 mm, 1.3 mm, 1.5 mm, etc. It should be noted that, in a processing error range, the connecting ring 131 has a uniform thickness. It should be understood that if the thickness of the connecting ring 131 is too thick, for example, the thickness of the connecting ring 131 is greater than 3 mm, the connecting ring 131 is hardly completely embedded in the faucet body 110, resulting in a decrease in the connection stability of the connecting ring and the faucet body 110. If the thickness of the connecting ring 131 is too thin, for example, if the thickness of the connecting ring 131 is less than 1 mm, a connecting area between the connecting ring 131 and the faucet body 110 is too small, and the connection stability between the connecting ring 131 and the faucet body 110 is seriously affected.

In a process of actually processing the faucet body 110, the water outlet pipe 120, and the water inlet pipe connecting component 130, in order to effectively increase connection stability between the water inlet pipe connecting component 130 and the faucet body 110, in the embodiment of the present disclosure, the water inlet pipe connecting component 130 further comprise a connecting structure 133 disposed on the outer surface 1312 of the connecting ring 131. The connecting structure 133 is made of the metal, and the connecting structure 133 is embedded in the faucet body 110.

For instance, the connecting structure 133 comprises connecting bars 1330. The connecting bars 1330 are disposed on the outer surface of the connecting ring 131 at intervals.

Specifically, each of the connecting bars 1330 extends along an axis direction of the connecting ring 131. The axis direction L1 of the connecting ring 131 is same as the length direction L3 of the faucet body 110. An extension direction of each of the connecting bars 1330 is substantially perpendicular to a spiral direction of the connecting threads 132. The connecting bars 1330 and the connecting threads 132 of the embodiment of the present disclosure are respectively disposed on the outer surface 1312 and the inner surface 1311 of the connecting ring 131. The extension direction of each of the connecting bars 1330 is different from the spiral direction S1 of the connecting threads 132. (i.e., the extension direction of each of the connecting bars 1330 is substantially perpendicular to the spiral direction S1 of the connecting threads 132), so an overall strength of the water inlet pipe connecting component 130 is increased to a certain extent.

Specifically, the connecting structure 133 comprises connecting groups. Each of the connecting groups comprises the connecting bars 1330. The connecting bars 1330 of each of the connecting groups are disposed at intervals around the outer surface of the connecting ring 131. The connecting groups are disposed at equal intervals along the axis direction of the connecting ring 131. Each two adjacent connecting bars in a same connecting group defines a connecting groove 1338.

The embodiment of the present disclosure takes an example that the connecting structure 133 comprises three connecting groups for illustration. The connecting groups comprise a first connecting group 1331, a second connecting group 1332, and a third connecting group 1333. The first connecting group 1331, the second connecting group 1332, and the third connecting group 1333 are sequentially disposed along the axis direction L1 of the connecting ring 131. A first connecting gap 1339 is formed between the first connecting group 1331 and the second connecting group

1332, and a second connecting gap 1339 is formed between the second connecting group 1332 and the third connecting group 1333.

For instance, the connecting bars 1330 in the first connecting group 1331 are connected to an edge of a first end of the connecting ring 131. Each of the connecting bars 1330 in the first connecting group 1331 comprises a first portion 1334 and a second portion 1335 connected to the first portion 1334. One end, away from a corresponding second portion 1335, of each first portion 1334 is connected to the edge of the first end of the connecting ring 131. Each first portion 1334 is obliquely disposed with respect to the edge of the first end of the connecting ring 131.

For instance, the connecting bars 1330 in the third connecting group 1333 are connected to an edge of a second end of the connecting ring 131. Each of the connecting bars 1330 in the third connecting group comprises a third portion 1336 and a fourth portion 1337 connected to the third portion 1336. One end, away from a corresponding fourth portion 1337, of each third portion 1336 is connected to the edge of the second end of the connecting ring 131. Each third portion 1336 is obliquely disposed with respect to the edge of the second end of the connecting ring 131.

For instance, the first connecting group 1331 and the third connecting group 1333 are symmetrically disposed with respect to the second connecting group 1332.

It is understood that the connecting structure 133 is not limited thereto, and other shapes may be adopted. For example, the connecting structure 133 comprises bumps disposed on the outer surface 1312 of the connecting ring 131. Alternatively, the connecting structure 133 comprises hook structures disposed on the outer surface 1312 of the connecting ring 131. A shape of each of the hook structures may refer to a hook tip structure of a fishing hook, and details thereof are not described herein.

The faucet body 110 comprises a mating structure 116 connected to the connecting structure 133, and the mating structure 116 is disposed on an inner wall of the water inlet channel 114. The mating structure 116 comprises mating grooves 1160, and the connecting bars 1330 are disposed in the mating grooves 1160. It is understood that each of the connection bars 1330 is placed in a corresponding mating groove 1160.

Specifically, the mating structure 116 comprises mating groups. Each of the mating groups comprises the mating grooves 1160. The mating grooves 1160 of each of the mating group are spaced apart from each other, and the mating grooves 1160 in each of the mating groups are disposed at equal intervals along a radial direction of the water inlet channel 114. A mating bar 1164 is formed between each two adjacent mating grooves 1160 in a same mating group. Each mating bar 1164 is disposed in a corresponding connecting groove 1338.

The embodiment of the present disclosure takes an example that the mating structure 116 comprises three mating groups for illustration. The mating structure comprises a first mating group 1161, a second mating group 1162, and a third mating group 1163. The connecting bars 1330 of the first connecting group 1331 are respectively disposed in the mating grooves of the first mating group 1161. The connecting bars 1330 of the second connecting group 1332 are respectively disposed in the mating grooves 1160 of the second mating group 1162. The connecting bars 1330 of the third connecting group 1333 are respectively disposed in the mating grooves 1160 of the third mating group 1163.

The first mating group 1161, the second mating group 1162, and the third mating group 1163 are sequentially disposed along the length direction L3 of the faucet body 110. A first mating ring 1165 is formed between the first mating group 1161 and the second mating group 1162, and a second mating ring 1165 is formed between the second mating group 1162 and the third mating group 1163. The mating rings 1165 are respectively disposed in the connecting gaps 1339.

The mating structure 116 further comprises a connecting boss 1166. The connecting boss 1166 is disposed in the water inlet channel 114 of the faucet body 110. The connecting boss 1166 is connected to one end of the water inlet pipe connecting component 130 to increase connection stability of the water inlet pipe connecting component 130 and the faucet body 110.

The water outlet pipe 120 is connected to the bottom surface 112 of the faucet body 110. One end of the water outlet pipe 120 is integrally formed on the bottom surface 112 of the faucet body 110. The water outlet pipe 120 comprises a second water outlet channel 127 communicated with the first water outlet channel 115. The second water outlet channel 127 penetrates two ends of the water outlet pipe 120.

In the actual mounting process, the water outlet pipe 120 may be sleeved with other components. In order to ensure waterproof performance of the water outlet pipe 120 after the water outlet pipe 120 is sleeved with other components, the water outlet pipe 120 of the embodiment of the present disclosure comprises at least two parts of pipe bodies and a waterproof limiting structure disposed on part of the pipe bodies.

Optionally, the water outlet pipe 120 comprises a first pipe 121 and a second pipe 122. The first pipe 121 and the second pipe 122 are fixedly connected. For instance, the first pipe and the second pipe are integrally formed. A first end of the first pipe 121 is connected to the bottom surface 112 of the faucet body 110, and a first end of the second pipe 122 is connected to a second end of the first pipe 121.

Exemplarily, the water outlet pipe 120 further comprises limiting rings 124. The limiting rings 124 are disposed on an outer surface 1221 of the second pipe 122. Each two adjacent limiting rings 124 define a limiting groove 125. The embodiment of the present disclosure takes an example that three limiting rings are provided for illustration. The limiting rings 124 comprises a first limiting ring 1241, a second limiting ring 1242, and a third limiting ring 1243. The first limiting ring 1241, the second limiting ring 1242, and the third limiting ring 1243 are sequentially disposed at intervals from a free end of the second pipe 122 to the first pipe 121. In other words, the first limiting ring 1241, the second limiting ring 1242, and the third limiting ring 1243 are sequentially disposed at intervals from the second pipe 122 along the length direction L3 of the faucet body 110. The first limiting ring 1241 and the second limiting ring 1242 define a first limiting groove 125, and the second limiting ring 1242 and the third limiting ring 1243 define a second limiting groove 125.

A thickness of the first limiting ring 1241, a thickness of the second limiting ring 1242, and a thickness of the third limiting ring 1243 gradually increase in sequence. It is understood that the water outlet pipe 120 is configured to be connected to other components, such as the external water pipe, and the external water pipe is sleeved on the second pipe 122 of the water outlet pipe 120. In the embodiment of the present disclosure, the first limiting ring 1241 is located at a second end of the second pipe 122 away from the first pipe 121. It should be noted that the second end of the second pipe 122 away from the first pipe 121 is a free end of the second pipe 122. The thickness of the first limiting ring 1241, the thickness of the second limiting ring 1242, and the thickness of the third limiting ring 1243 gradually increase in sequence, which facilitate the external water pipe being conveniently sleeved on the second pipe 122. Moreover, after the external water pipe is sleeved on the first limiting ring 1241, the second limiting ring 1242, and the third limiting ring 1243, a strength of the second pipe 122 is increased to a certain extent. Especially, the closer the second pipe 122 to the first pipe 121, the greater the strength of the second pipe 122, which ensures connection stability between the water outlet pipe 120 and the external water pipe.

It is understood that waterproof rings are respectively mounted in the first limiting groove 125 and the second limiting groove 125. The waterproof rings abut against the external water pipe sleeved on the second pipe 122, thereby preventing water leakage. It is understood that in a process that the external water pipe is sleeved on the second pipe 122, the waterproof rings are pressed to deform, thereby further preventing water leakage.

In order to further prevent the water leakage, a diameter of the third limiting ring 1243 gradually increases from the free end of the second pipe 122 to the first pipe 121. A maximum outer diameter of the third limiting ring 1243 is greater than a maximum outer diameter of the first limiting ring 1241 and a maximum outer diameter of the second limiting ring 1242. A minimum outer diameter of the third limiting ring 1243 is equal to an outer diameter of the first limiting ring 1241 and an outer diameter of the second limiting ring 1242, which on one hand, increase stability of the second pipe 122 after the second pipe 122 is sleeved with the external water pipe, and on the other hand, prevents the water leakage.

The water outlet pipe 120 further comprises a reinforcing ring 126 disposed on an outer surface of the second pipe 122, and an annular groove 128 is defined between the reinforcing ring 126 and the third limiting ring 1243. It should be noted that during a process of connecting the second pipe 122 of the water outlet pipe 120 with the external water pipe, the external water pipe is sleeved on the second pipe 122 and is limited by the reinforcing ring 126, so that a portion of the external water pipe is disposed in the annular groove 128. Therefore, the external water pipe may be further fastened at the annular groove 128 by a structural component, so as to ensure that the external water pipe does not leak after being connected to the second pipe 122. The structural component may be a plastic component.

The water outlet pipe 120 further comprises a reinforcing structure 123. The reinforcing structure 123 is disposed on an outer surface 1211 of the first pipe 121, and the reinforcing structure 123 is at least connected to the bottom surface 112 of the faucet body 110. For instance, a first end of the reinforcing structure 123 is connected to the bottom surface 112 of the faucet body 110, so that the reinforcing structure 123 enhances a strength of the water outlet pipe 120 and ensures the water outlet pipe 120 being stable during mounting. A second end of the reinforcing structure 123 is connected to the second pipe 122, thereby further increasing the strength of the second pipe 122. Specifically, the second end of the reinforcing structure 123 is connected to the reinforcing ring 126.

The reinforcing structure 123 comprises at least one reinforcing rib. Specifically, reinforcing ribs 1230 are provided in the embodiment. The reinforcing ribs 1230 are disposed at intervals on the outer surface 1211 of the first pipe 121. The embodiment of the present disclosure takes an example that four reinforcing ribs 1230 are provided for illustration. It is understood that the reinforcing structure 123 may comprise only one reinforcing rib 1230 or another number of reinforcing ribs 1230, which are not limited thereto.

Optionally, a first end of each of the reinforcing ribs 1230 is connected to the bottom surface 112 of the faucet body 110, and a second end of each of the reinforcing ribs 1230 is connected to the reinforcing ring 126. It should be noted that the second end of each of the reinforcing ribs 1230 is spaced apart from the second pipe 122.

Optionally, a size of at least a portion of at least one of the reinforcing ribs 1230 gradually increases in a direction from the second pipe 122 to the bottom surface 112 of the faucet body 110. For instance, a thickness of at least a portion of at least one of the reinforcing ribs 1230 gradually increases in the direction from the second pipe 122 to the bottom surface 112 of the faucet body 110. Alternatively, a width of at least a portion of at least one of the reinforcing ribs 1230 gradually increases in a direction from the second pipe 122 to the bottom surface 112 of the faucet body 110.

The reinforcing structure 123 comprises a first reinforcing rib 1231, a second reinforcing rib 1232, a third reinforcing rib 1233, and a fourth reinforcing rib 1234. The first reinforcing rib 1231, the second reinforcing rib 1232, the third reinforcing rib 1233, and the fourth reinforcing rib 1234 are spaced apart and are disposed on the outer surface of the first pipe 121.

The first reinforcing rib 1231 is closer to the water inlet channel 114 than the second reinforcing rib 1232, the third reinforcing rib 1233, and the fourth reinforcing rib 1234. The second reinforcing rib 1232 and the third reinforcing rib 1233 are closer to the water inlet channel 114 than the fourth reinforcing rib 1234. For instance, the first reinforcing rib 1231 is disposed opposite to the fourth reinforcing rib 1234, and the second reinforcing rib 1232 is disposed opposite to the third reinforcing rib 1233.

The size of at least a portion of at least one of the first reinforcing rib 1231, the second reinforcing rib 1232, the third reinforcing rib 1233, and the fourth reinforcing rib 1234 gradually increases in the direction from the second pipe 122 to the bottom surface 112 of the faucet body 110.

Optionally, a width of the second reinforcing rib 1232 and a width of the third reinforcing rib 1233 gradually increase from the second pipe 122 to the bottom surface 112 of the faucet body 110. In other alternative embodiments, a thickness of the second reinforcing rib 1232 and a thickness of the third reinforcing rib 1233 gradually increases from the second pipe 122 to the bottom surface 112 of the faucet body 110. In other alternative embodiments, the width and thickness of the second reinforcing rib 1232 and the width and thickness of the third reinforcing rib 1233 gradually increase from the second pipe 122 to the bottom surface 112 of the faucet body 110. Optionally, the second reinforcing rib 1232 and the third reinforcing rib 1233 are symmetrically disposed on the first pipe 121.

Optionally, the fourth reinforcing rib 1234 is uniformly disposed away from the first pipe 121. In other alternative embodiments, a width of the fourth reinforcing rib 1234 gradually increases from the second pipe 122 to the bottom surface 112 of the faucet body 110. In other alternative embodiments, a thickness of the fourth reinforcing rib 1234 gradually increases from the second pipe 122 to the bottom surface 112 of the faucet body 110. In other alternative embodiments, the width and thickness of the fourth reinforcing rib 1234 gradually increase from the second pipe 122 to the bottom surface 112 of the faucet body 110.

Optionally, the first reinforcing rib 1231 comprises a first reinforcing section 12311 and a second reinforcing section 12312 connected to the first reinforcing section 12311. The first reinforcing section 12311 is connected to the bottom surface 112 of the faucet body 110, and the second reinforcing section 12312 is connected to the reinforcing ring 126. A width of the first reinforcing section 12311 is not less than twice a width of the second reinforcing section 12312.

Optionally, the width of the first reinforcing section 12311 gradually increases from the second pipe 122 to the bottom surface 112 of the faucet body 110. In other alternative embodiments, a thickness of the first reinforcing section 12311 gradually increases from the second pipe 122 to the bottom surface 112 of the faucet body 110. In other alternative embodiments, the width and thickness of the first reinforcing section 12311 gradually increase from the second pipe 122 to the bottom surface 112 of the faucet body 110.

Optionally, a width of the second reinforcing section 12312 gradually increases from the second pipe 122 to the bottom surface 112 of the faucet body 110. In other alternative embodiments, a thickness of the second reinforcing section 12312 gradually increases from the second pipe 122 to the bottom surface 112 of the faucet body 110. In other alternative embodiments, the width and thickness of the second reinforcing section 12312 gradually increase from the second pipe 122 to the bottom surface 112 of the faucet body 110.

It is understood that in a process of installing a faucet, the user needs to mount and fix the single coupled valve body 100 to the predetermined position. For instance, the faucet body 110 and an external mounting pipe are sleeved with each other, and the external mounting pipe is sleeved on an outer surface of the faucet body 110. In the embodiment of the present disclosure, a mounting component 140 is mounted on the outer surface of the faucet body 110, and the external mounting pipe is sleeved on the mounting component 140 and connected to the mounting component. That is, the single coupled valve body 100 further comprises the mounting component 140. The mounting component 140 is made of the metal, such as copper. The mounting component 140 made of the metal is sleeved in the external mounting pipe to increase the strength.

It should be noted that the metal used by the mounting component 140 is not limited to copper, and the metal may be the stainless steel.

The mounting component 140 comprises a mounting ring 141 and mounting threads 142. The mounting ring 141 and the mounting threads 142 are made of the metal. The mounting ring 141 and the mounting threads 142 are integrally disposed. The mounting ring 141 is hollow. The mounting threads 142 are disposed on an outer surface of the mounting ring 141. The mounting ring 141 is sleeved on the outer surface of the faucet body 110. In the embodiment of the present disclosure, a portion of the single-split faucet valve body 100 connected to the external mounting pipe, such as the mounting threads 142, are made of the metal, such as copper, which increase the strength compared with the plastic. Especially in the actual mounting process, the mounting threads 142 made of the metal are not easily damaged, and screwing stability of the external mounting pipe and the mounting threads 142 is ensured to a certain extent.

Specifically, the mounting component 140 and the faucet body 110 are injection molded to form the single coupled valve body 100. For instance, the mounting component 140 is positioned in the mold, and then injection molding is performed to form the faucet body 110 and the water outlet pipe 120.

Optionally, the mounting component 140 further comprises a mounting structure 143 disposed on an inner surface of the mounting ring 141. The mounting structure 143 is made of the metal. The mounting structure 143 is embedded in the faucet body 110. The mounting structure 143 effectively increases connection stability between the mounting component 140 and the faucet body 110. The mounting structure comprises mounting bars 1430. The mounting bars 1430 are disposed on the inner surface of the mounting ring 141 at intervals.

Each of the mounting bars 1430 extends along an axis direction L2 of the mounting ring 141. The axis direction L2 of the mounting ring 141 is same as the length direction L3 of the faucet body 110. An extension direction of each of the mounting bars 1430 is substantially perpendicular to a spiral direction S2 of the mounting threads 142. Therefore, in the embodiment of the present disclosure the mounting bars 1430 and mounting threads 142 are respectively disposed on the inner surface and the outer surface of the mounting ring 141. The extension direction of the mounting bars 1430 is different from the spiral direction S2 of the mounting threads 142. For instance, the extension direction of each of the mounting bars 1430 is substantially perpendicular to the spiral direction S2 of the mounting threads 142.1, which increases an overall strength of the mounting component 140 to a certain extent.

A cross section of each of the mounting bars 1430 is triangular, and each of the mounting bars 1430 has two inclined surfaces, which are respectively a first inclined surface 1434 and a second inclined surface 1435. A mounting groove 1436 is formed between each two adjacent mounting bars 1430. It is understood that the cross section of each of the mounting bars 1430 may also be another shape, such as a rectangle.

Optionally, the mounting structure 143 comprises mounting groups. Each of the mounting groups comprises the mounting bars 1430. The mounting bars 1430 of each of the mounting groups are disposed at intervals around the inner surface of the mounting ring 141. The mounting groups are disposed at equal intervals along the axis direction L2 of the mounting ring 141.

The embodiment of the present disclosure takes an example that three mounting groups are provided for illustration. The mounting groups comprise a first mounting group 1432, a second mounting group 1432, and a third mounting group 1433. The first mounting group 1431, the second mounting group 1432, and the third mounting group 1433 are sequentially disposed along the axis direction L2 of the mounting ring 141. A first mounting gap 1437 is defined between the first mounting group 1431 and the second mounting group 1432, a second mounting gap 1437 is formed between the second mounting group 1432 and the third mounting group 1433, and the two mounting gaps 1437 are disposed around the inner surface of the mounting ring 141.

The mounting bars 1430 in the first mounting group 1431 are connected to an edge of a first end of the mounting ring 141, and the mounting bars 1430 in the third connecting group 1433 are connected to an edge of a second end of the mounting ring 141. Specifically, the first mounting group 1431 and the third mounting group 1433 are symmetrically disposed with respect to the second mounting group 1432.

It is understood that the mounting structure 143 is not limited thereto, and other shapes may also be adopted. For instance, the mounting structure 143 comprises protrusions disposed on an outer surface of the mounting ring 141. Alternatively, the mounting structure 143 comprises barb structures disposed on an outer surface of the mounting ring 141.

The faucet body 110 comprises a fitting structure 117 connected to the mounting structure 143, and the fitting structure 117 is disposed on the outer surface of the faucet body 110. The fitting structure 117 comprises fitting grooves 1170, and the mounting bars 1430 are respectively disposed in the fitting grooves 1170. It is understood that each of the mounting bars 1430 is placed in a corresponding fitting groove 1170.

The fitting structure 117 comprises fitting groups. Each of the fitting groups comprises the fitting grooves 1170. The fitting grooves of each of the fitting groups are spaced apart from each other, and the fitting grooves 1170 in each of the fitting groups are disposed at equal intervals along the radial direction of the water inlet channel 114. A fitting bar 1174 is formed between each two adjacent fitting grooves 1170 in a same fitting group, and each fitting bar 1174 is disposed in a corresponding mounting groove 1436.

The embodiment of the present disclosure takes an example that three fitting groups are provided for illustration. Specifically, the fitting structure 117 comprises a first fitting group 1171, a second fitting group 1172 and a third fitting group 1173. The mounting bars 1430 of the first mounting group 1431 are disposed in the fitting grooves 1170 of the first fitting group 1171, the mounting bars 1430 of the second mounting group 1432 are disposed in the fitting grooves 1170 of the second fitting group 1172, and the mounting bars 1430 of the third mounting group 1433 are disposed in the fitting grooves 1170 of the third fitting group 1173.

The first fitting group 1171, the second fitting group 1172 and the third fitting group 1173 are disposed in sequence along the length direction L3 of the faucet body 110. A first fitting ring 1175 is disposed between the first fitting group 1171 and the second fitting group 1172. A second fitting ring 1175 is disposed between the installation group 1172 and the third installation group 1173. The first fitting ring and the second fitting ring are respectively disposed in the first mounting gap 1437 and the second mounting gap 1437.

It should be noted that the mounting component 140 in the single coupled valve body 100 may also be made of plastic. An exemplary description is provided below in conjunction with other drawings.

Figure 14:
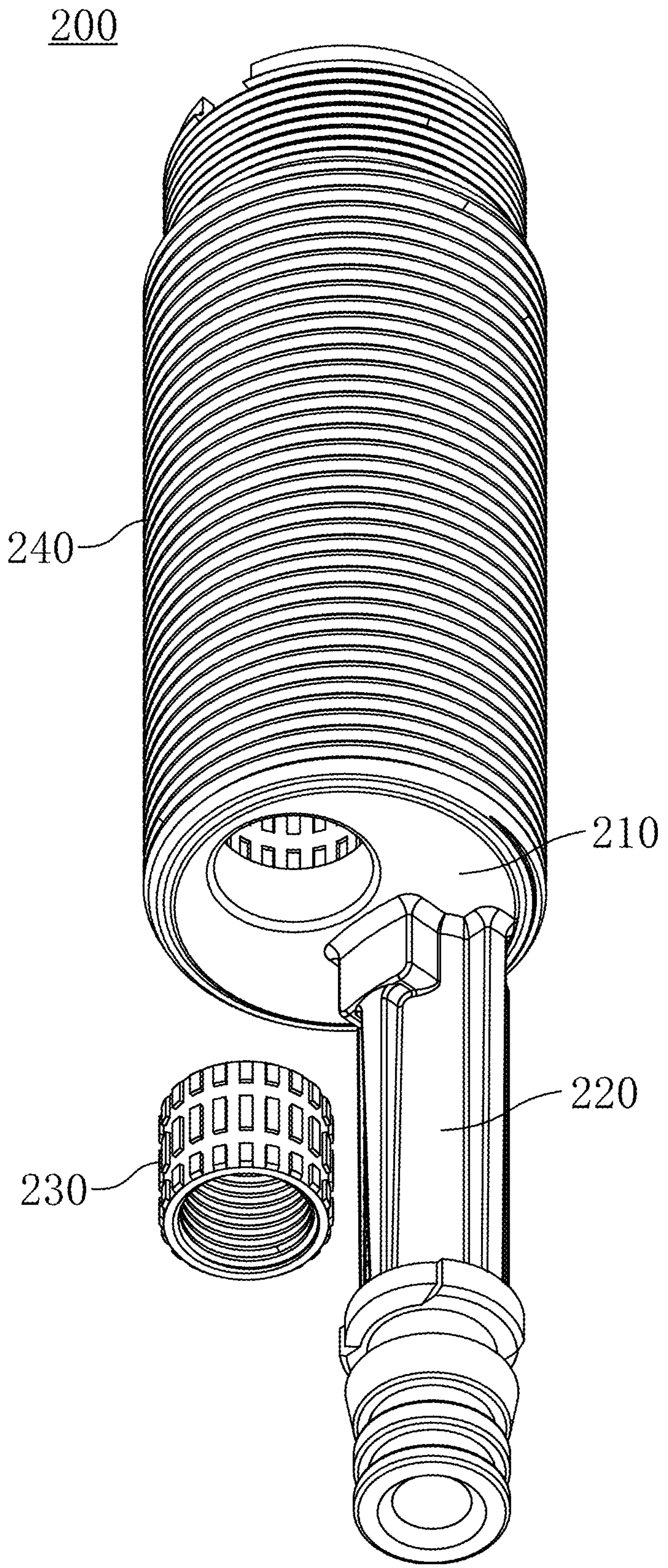
FIG. 14 is an exploded schematic diagram of the single coupled valve body of the faucet according to a second embodiment of the present disclosure.
Figure 15:
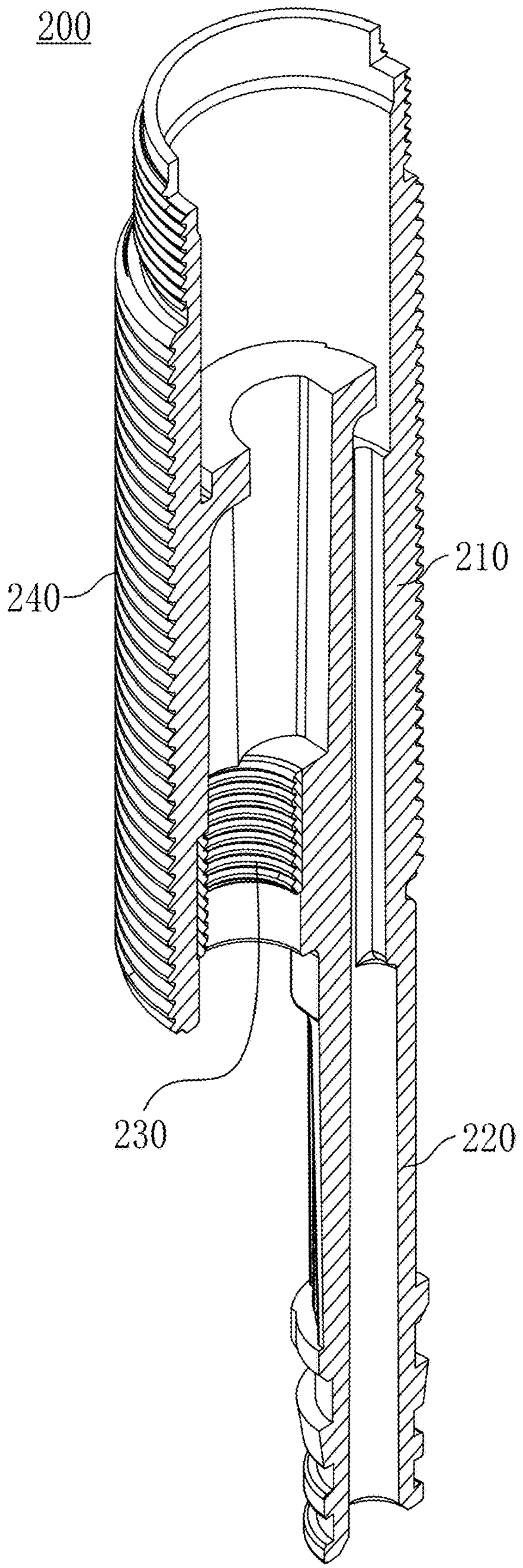
FIG. 15 is a cross-sectional schematic diagram of the single coupled valve body of the faucet according to the second embodiment of the present disclosure.

As shown in FIGS. 14-15, a difference between a single coupled valve body 200 and the single coupled valve body 100 is that the mounting component 140 in the single coupled valve body 100 is replaced with outer threads 240. Other structures of the single coupled valve body 200 are same as that of the single coupled valve body 100. A faucet body 210, a water outlet pipe 220, and water inlet pipe connecting component 230 in the single coupled valve body 200 can refer to the faucet body 110, the water outlet pipe 120, and the water inlet pipe connecting component 130 of the single coupled valve body 100, which are not repeatedly illustrated herein.

The outer threads 240 are disposed on an outer surface of the faucet body 210. The outer threads 240 is made of plastic. The outer threads 240, the faucet body 210, and the water outlet pipe 220 are integrally formed by injection molding.

It should be noted that the water inlet pipe connecting component 130 in the single coupled valve body 100 may also be made of plastic. An exemplary description is provided below in conjunction with other drawings.

Figure 16:
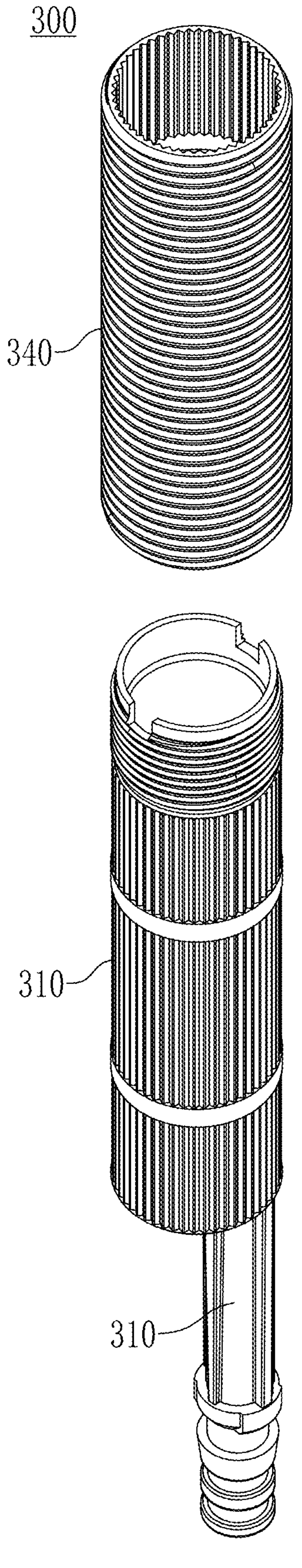
FIG. 16 is an exploded schematic diagram of the single coupled valve body of the faucet according to a third embodiment of the present disclosure.
Figure 17:
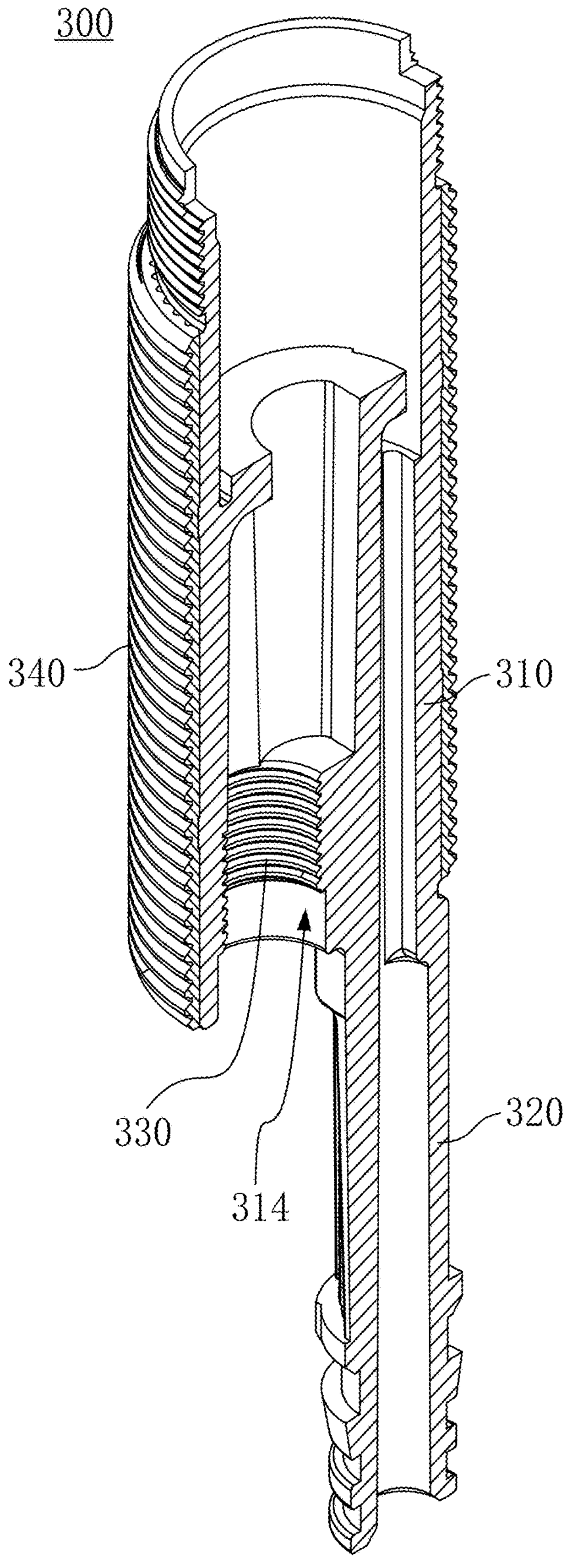
FIG. 17 is a cross-sectional schematic diagram of the single coupled valve body of the faucet according to the third embodiment of the present disclosure.

As shown in FIGS. 16-17, a difference between a single coupled valve body 300 and the single coupled valve body 100 is that the water inlet pipe connecting component 130 in the single coupled valve body 100 is replaced with water inlet pipe connecting threads 330. Other structures of the single coupled valve body 300 are same as that of the single coupled valve body 100. A faucet body 310, a water outlet pipe 320, and a mounting component 340 in the single coupled valve body 300 can refer to the faucet body 110, the water outlet pipe 120, and the mounting components 140 of the single coupled valve body 100, which are not described herein.

The water inlet pipe connecting threads 330 are disposed in the water inlet channel 314 of the faucet body 310. The water inlet pipe connecting threads 330 are made of plastic. The water inlet pipe connecting threads 330, the faucet body 310, and the water outlet pipe 320 are integrally formed by injection molding.

It should be noted that both of the water inlet pipe connecting component 130 and the mounting component 140 in the single coupled valve body 100 may be made of the plastic. An exemplary description is provided below in conjunction with other drawings.

Figure 18:
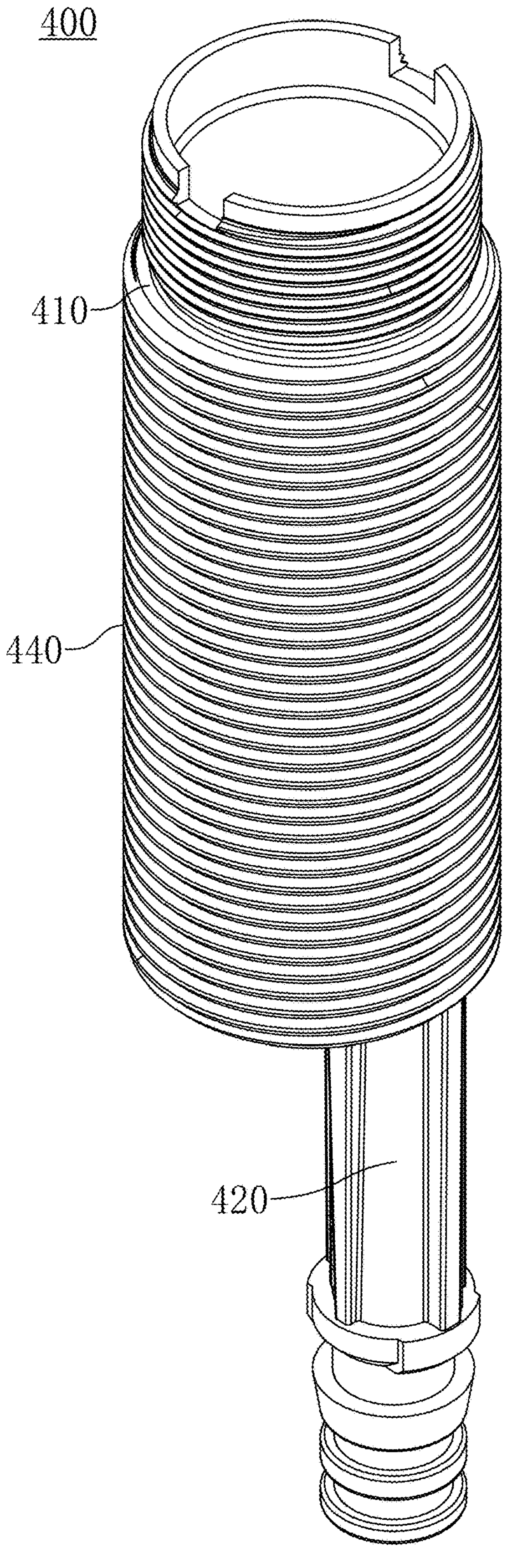
FIG. 18 is an exploded schematic diagram of the single coupled valve body of the faucet according to a fourth embodiment of the present disclosure.
Figure 19:
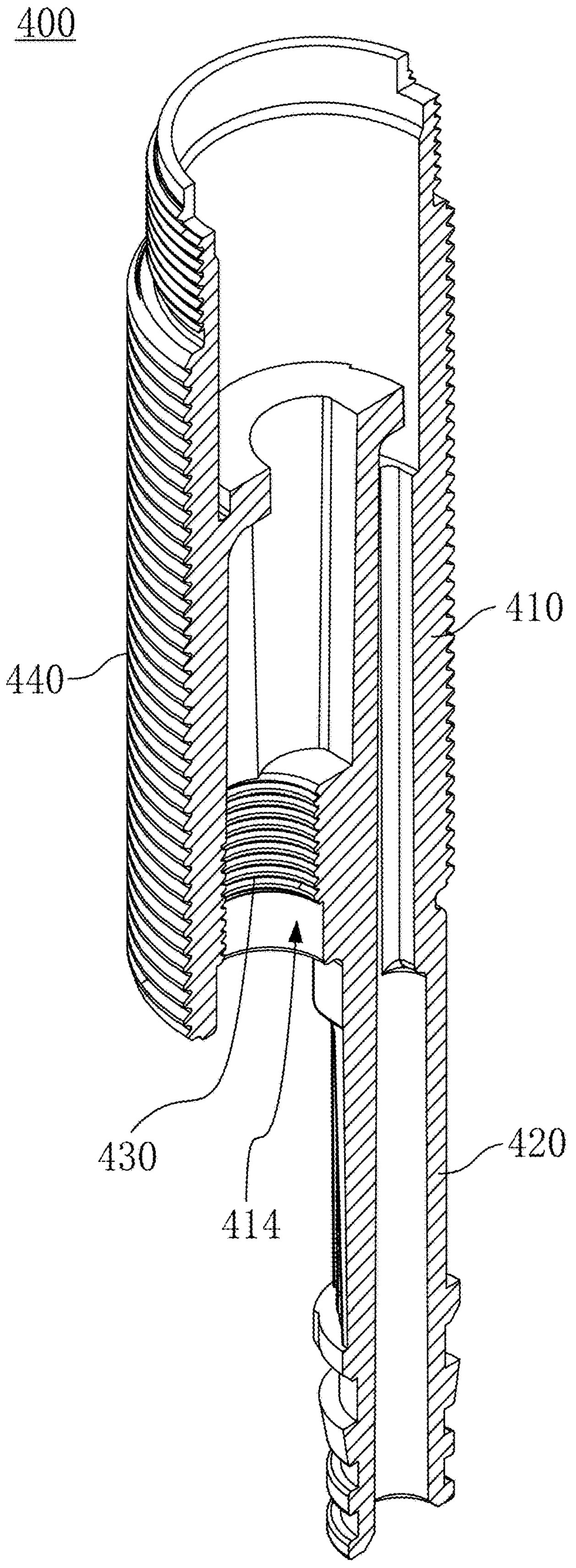
FIG. 19 is a cross-sectional schematic diagram of the single coupled valve body of the faucet according to the fourth embodiment of the present disclosure.

As shown in FIGS. 18 and 19, differences between a single coupled valve body 400 and the single coupled valve body 100 is that the water inlet pipe connecting component 130 in the single coupled valve body 100 is replaced with water inlet pipe connecting threads 430 and the mounting component 140 in the single coupled valve body 100 is replaced with outer threads 440. Other structures of the single coupled valve body 300 are same as that of the single coupled valve body 100. A faucet body 410 and a water outlet pipe 420 in the single coupled valve body 400 can refer to the faucet body 110 and the water outlet pipe 120 of the single coupled valve body 100, which are not described herein.

The water inlet pipe connecting threads 430 are disposed in the water inlet channel 414 of the faucet body 410. The outer threads 440 are disposed on an outer surface of the faucet body 410. The water inlet pipe connecting threads 430 and the outer threads 440 are made of plastic. The water inlet pipe connecting threads 430, the outer threads 440, the faucet body 410, and the water outlet pipe 420 are integrally formed by injection molding. The single coupled valve body 400 in the embodiment of the present disclosure is entirely made of the plastic, and are directly formed by injection molded during the actual processing. A processing technology is simple, cost is low, and it is convenient for transportation.

Since the water outlet pipe 120 is connected to the bottom surface 112 of the faucet body 110 and is adjacent to the water inlet channel 114, it is not easy to directly form the water inlet pipe connecting threads made of the plastic in the water inlet channel 114 during the actual processing. Therefore, the water inlet pipe connecting component is adopted in the embodiment of the present disclosure rather than the water inlet pipe connecting threads made of the plastic.

It should be noted that a method of mounting the valve core is not limited to the valve core mounting outer threads 1132 for mounting the valve core. The valve core may also be mounted in other ways. Examples are provided below with reference to other drawings.

Figure 20:
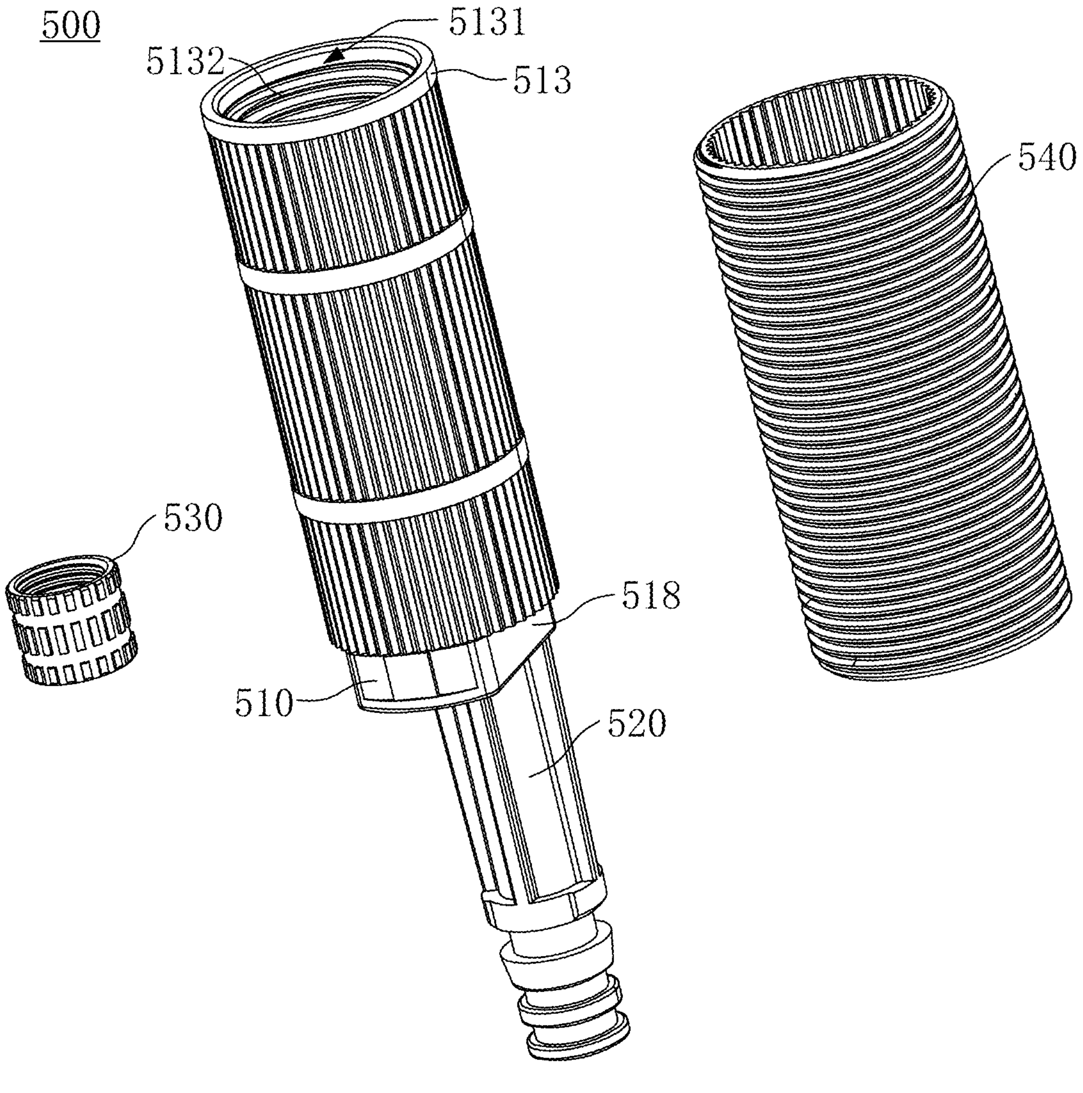
FIG. 20 is an exploded schematic diagram of the single coupled valve body of the faucet according to a fifth embodiment of the present disclosure.

As shown in FIG. 20, a difference between a single coupled valve body 500 and the single coupled valve body 100 is that valve core mounting threads are disposed on an inner surface of a valve core mounting wall 513 of the single coupled valve body 500.

The valve core is mounted in the valve core mounting groove 5131 of the single coupled valve body 500 and is connected to the valve core mounting inner threads 5132. The valve core mounting inner threads 5132 are threaded with threads on an outer surface of the valve core. A water inlet pipe connecting component 530 and the mounting component 540 in the single coupled valve body 500 can refer to the water inlet pipe connecting component 130 and the mounting component 140 in the single coupled valve body 100, which are not described herein. It is understood that portions of the faucet body 510 in the single coupled valve body 500 used to connect to the water inlet pipe connecting component 130 and the mounting component 140 can refer to the faucet body 110 in the single coupled valve body 100, which is not repeatedly described herein.

It should be noted that at least one of the water inlet pipe connecting component 530 and the mounting component 540 is made of the plastic and is integrally formed with the faucet body 510, such as shown in FIGS. 14-19, which is not described herein.

Figure 21:
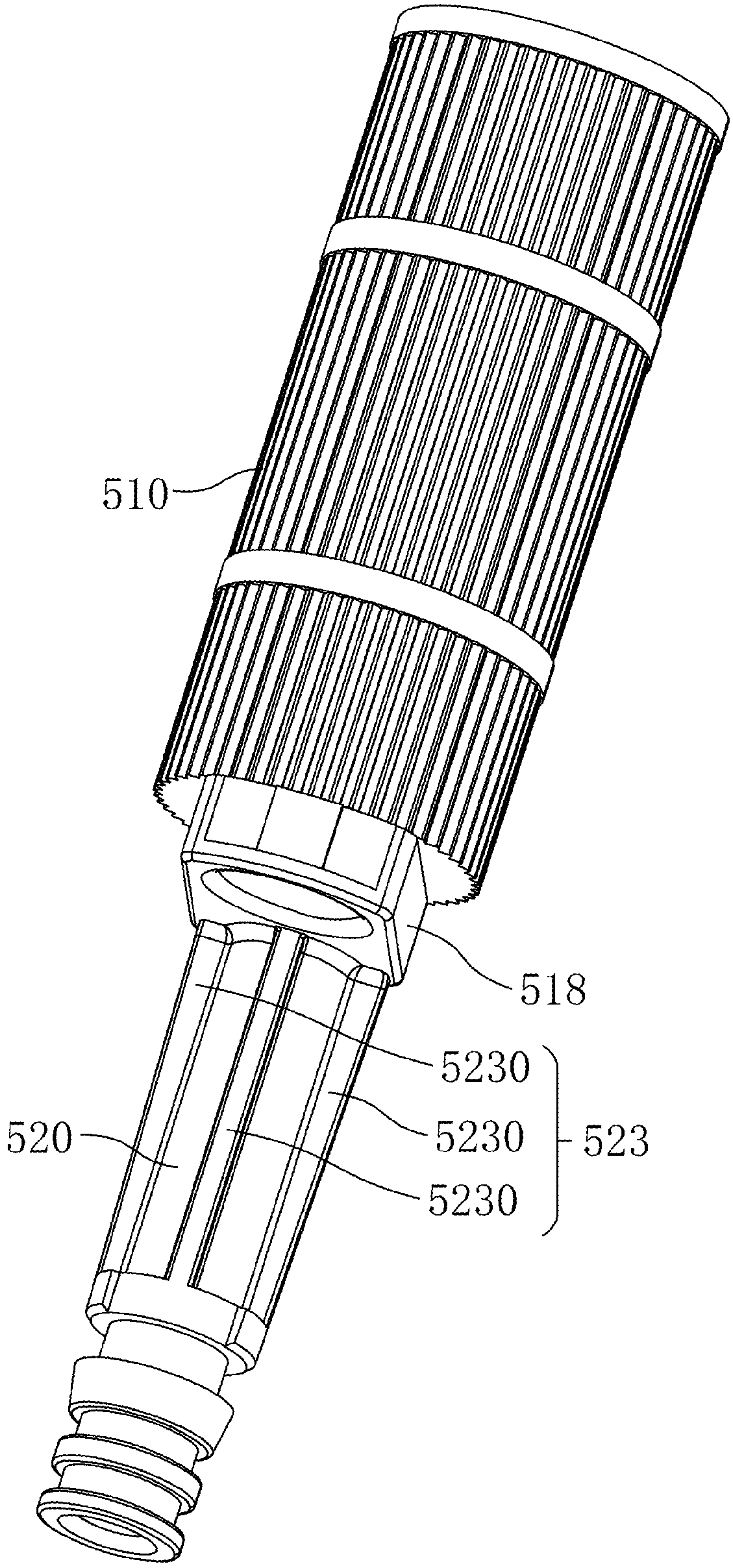
FIG. 21 is a schematic diagram of the faucet body and the water outlet pipe of the single coupled valve body of the faucet according to the fifth embodiment of the present disclosure.
Figure 22:
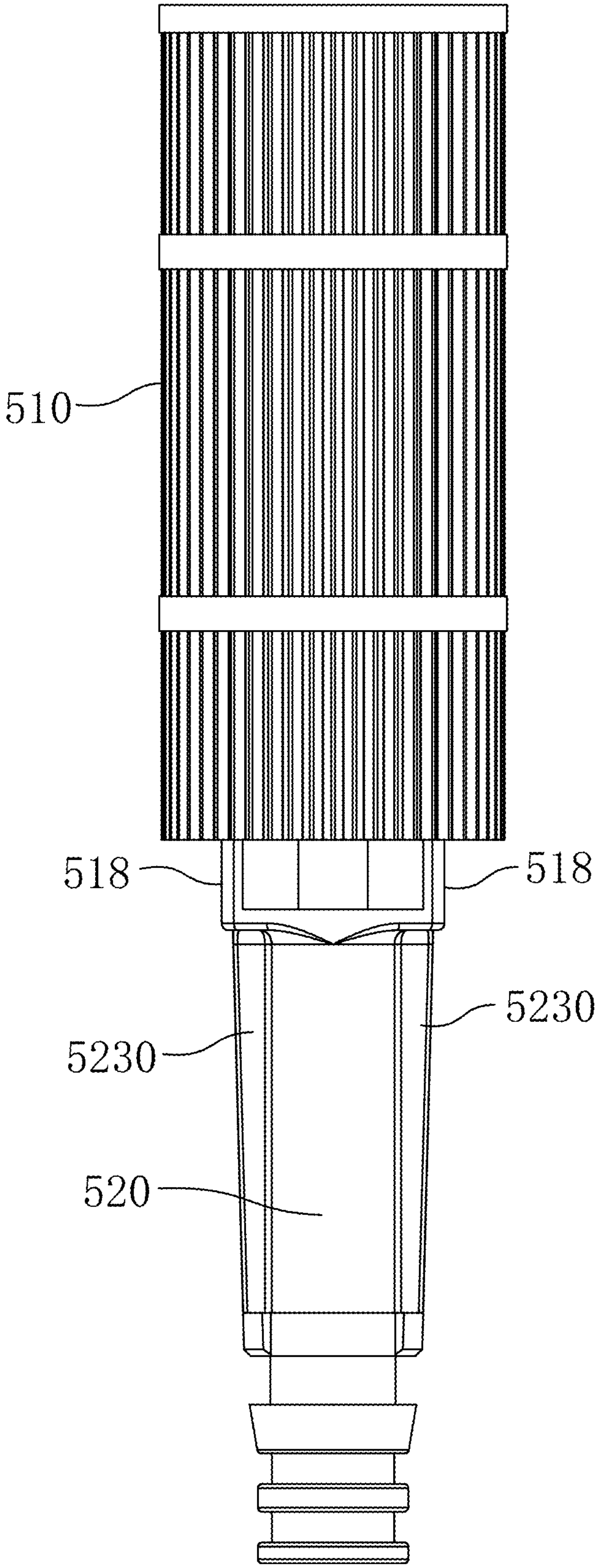
FIG. 22 is another schematic diagram of the faucet body and the water outlet pipe of the single coupled valve body of the faucet according to the fifth embodiment of the present disclosure.

As shown in FIGS. 21 and 22, differences between the single coupled valve body 500 and the single coupled valve body 100 comprise that the single coupled valve body 500 comprises two steps 518 at one end away from the valve core mounting wall 513. The two steps 518 are opposite to each other. The two steps 518 are configured for the user to hold, which facilitates the mounting of the single coupled valve body 500. It should be noted that the single coupled valve body 500 may be designed to have a structure similar to the faucet body 110 without providing the two steps 518.

The differences between the single coupled valve body 500 and the single coupled valve body 100 further comprises that a reinforcing structure 523 of the water outlet pipe 520 comprises three reinforcing ribs 5230, and the three reinforcing ribs 5230 are spaced apart on an outer surface of the water outlet pipe 520. At least one of the reinforcing ribs 5230 in the reinforcing structure 523 can refer to any one of the reinforcing ribs 1230, which is not described herein. For other structures of the water outlet pipe 520, reference can be made to the water outlet pipe 120, which are not described herein.

Figure 23:
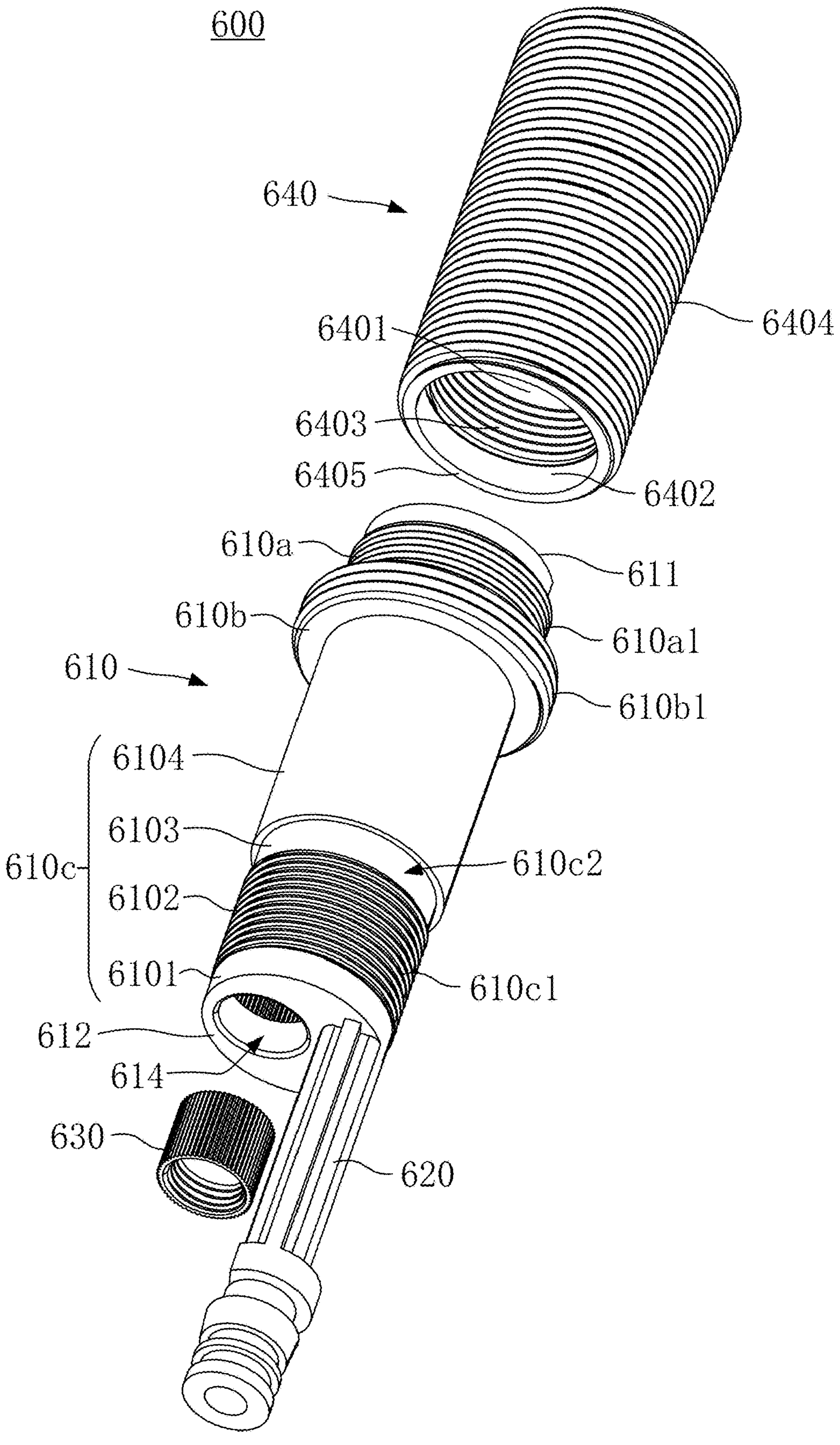
FIG. 23 is an exploded schematic diagram of the single coupled valve body of the faucet according to a sixth embodiment of the present disclosure.
Figure 24:
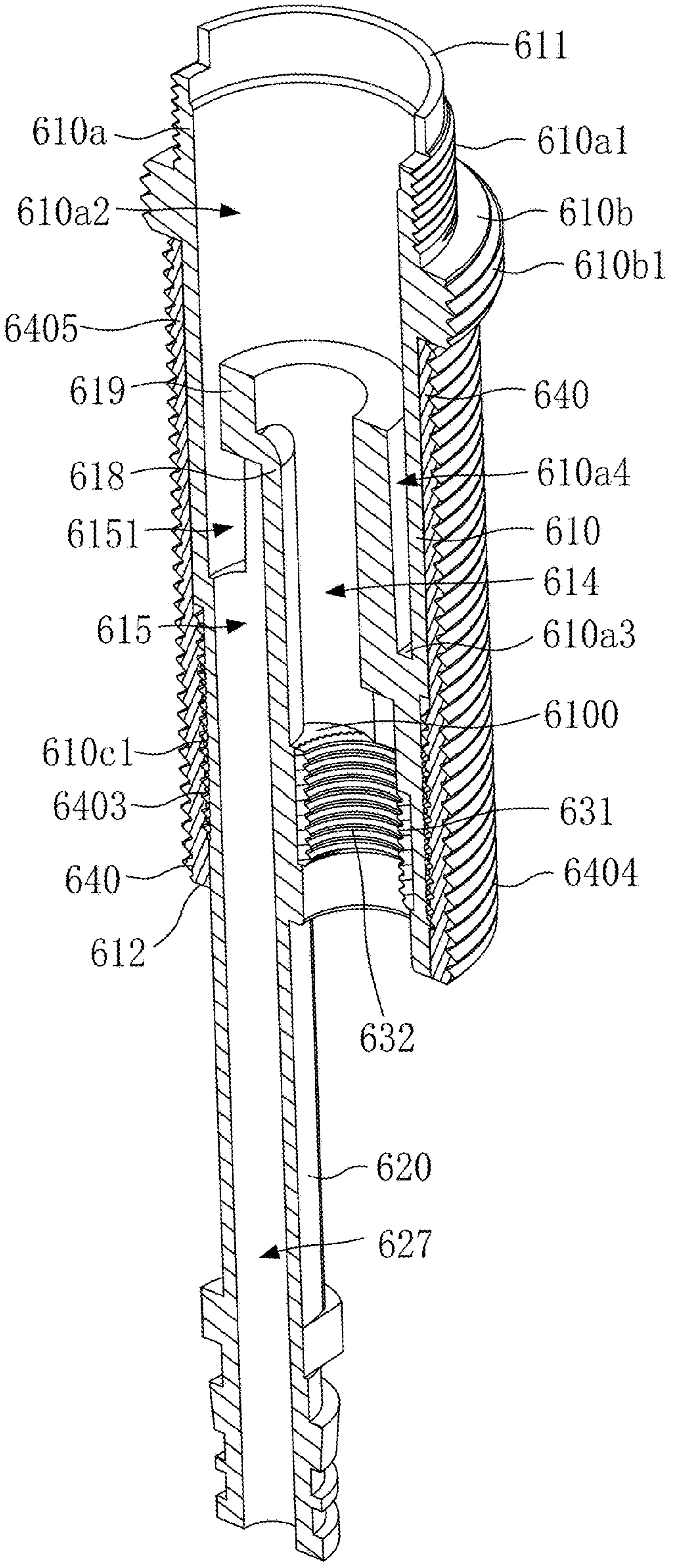
FIG. 24 is a cross-sectional schematic diagram of the single coupled valve body of the faucet according to the sixth embodiment of the present disclosure.
Figure 25:
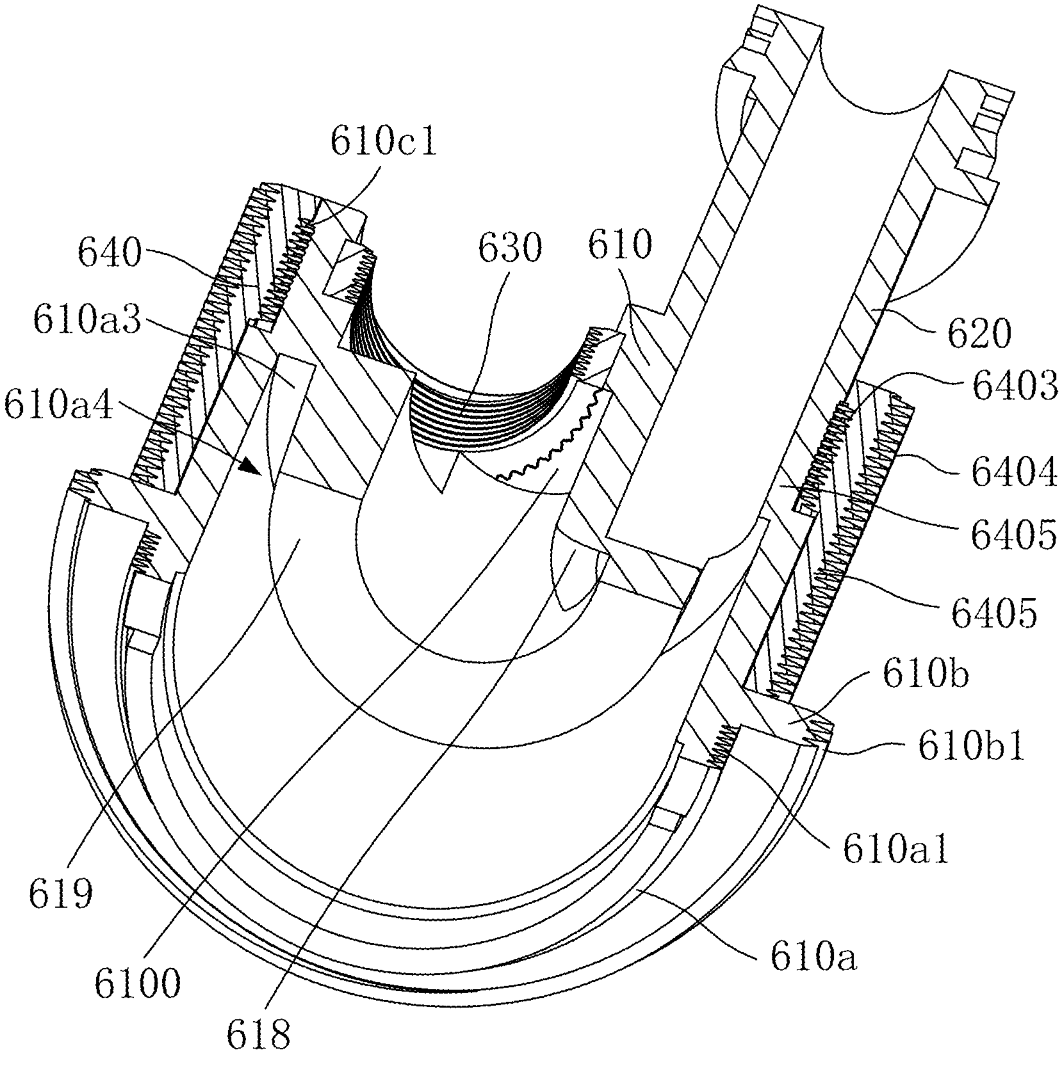
FIG. 25 is another cross-sectional schematic diagram of the single coupled valve body of the faucet according to the sixth embodiment of the present disclosure.

As shown in FIGS. 23-25, the present disclosure further provides a single coupled valve body 600 of a faucet. The single coupled valve body 600 comprises a faucet body 610 and a water outlet pipe 620. The faucet body 610 has a top surface 611 and a bottom surface 612 opposite to the top surface 611. A valve core mounting groove **610*a*2 is defined on the top surface 611 of the faucet body 610. The faucet body 610 defines a water inlet channel 614 and a first water outlet channel 615. The water inlet channel 614 and the first water outlet channel 615 are communicated with the valve core mounting groove 610*a*2 and penetrate the top surface 611 and the bottom surface 612 of the faucet body 610**.

A difference between the single coupled valve body 600 and the single coupled valve body 100 is that the faucet body 610 comprises a first mounting portion **610*a*, a second mounting portion 610*b*, and a third mounting portion 610*c*. The first mounting portion 610*a*, the second mounting portion 610*b*, and the third mounting portion 610*b* are connected in sequence. The first mounting portion 610*a* is away from the bottom surface 612 of the faucet body 610. The third mounting portion 610*c* is away from the top surface 611 of the faucet body 610. An outer diameter of the second mounting portion 610*b* is greater than an outer diameter of the first mounting portion 610*a* and an outer diameter of the third mounting portion 610*c***.

In some cases, the first mounting portion **610*a* is served as a valve core mounting wall. In some other cases, the first mounting portion 610*a* and the second mounting portion 610*b* jointly served as the valve core mounting wall. In some other cases, a portion of the first mounting portion 610*a*, a portion of the second mounting portion 610*b*, and a portion of the third mounting portion 610*c* jointly served as the valve core mounting wall. For instance, the valve core mounting wall may be referred to the valve core mounting wall 113**, and details are not described herein again.

In one embodiment, valve core mounting outer threads **610*a*1 are disposed on an outer surface of the first mounting portion 610*a*. The valve core mounting outer threads 610*a*1 and the first mounting portion 610*a* are integrally disposed. The valve core mounting outer threads 610*a*1 may be referred to the valve core mounting outer threads 1132**, and details are not described herein again.

In one embodiment, second threads **610*b* are disposed on an outer surface of the second mounting portion 610*b*. The second threads 610*b* and the second mounting portion 610*b*** are integrally disposed.

In one embodiment, outer mounting threads 6404 are disposed on an outer surface of the third mounting portion **610*c*. The outer mounting threads 6404 and the third mounting portion 610*c* are integrally disposed or separately disposed. When the outer mounting threads 6404 and the third mounting portion 610*c* are integrally disposed, reference may be made to the outer threads 240 shown in FIG. 15**, and details are not described herein again.

In one embodiment, the outer mounting threads 6404 and the third mounting portion **610*c* are separately disposed. The single coupled valve body 600 further comprises a mounting component 640. The mounting component 640 is hollow. The mounting component 640 comprises the outer mounting threads 6404 and a mounting ring 6405. The outer mounting threads 6404 are disposed on an outer surface of the mounting ring 6405**.

A connection relationship between the mounting component 640 and the third mounting portion **610*c* may refer to a connection relationship between the mounting component 140 and the faucet body 110**, which is not described in detail herein.

Alternatively, the mounting component 640 and the third mounting portion **610*c* may be connected in other ways. Specifically, a difference between the connection relationship of the mounting component 640 and the third mounting portion 610*c* and the connection relationship of the mounting component 140 and the faucet body 110 is that the mounting component 640 is connected to the third mounting portion 610*c***.

For instance, the mounting component 640 further comprises inner mounting threads 6403 disposed on an inner surface of the mounting ring 6405. Correspondingly, first threads **610*c*1 are disposed on an outer surface of the third mounting portion 610*c*. The first threads 610*c*1 and the third mounting portion 610*c* are integrally disposed. The mounting ring 6405 is sleeved on the outer surface of the third mounting portion 610*c*, and the first threads 610*c*1 are connected to the inner mounting threads 6403. In other words, the first threads 610*c*1 are disposed on the outer surface of the faucet body 610, the mounting ring 6405 is sleeved on the outer surface of the faucet body 610, and the first threads 610$c$1 are connected to the inner mounting threads 6403**.

In one optional embodiment, the inner mounting threads are disposed on all of the inner surface of the mounting ring 6405. Correspondingly, the first threads 610$c$1 are disposed on all of the outer surface of the third mounting portion 610$c$.

In one embodiment, a height of the second smooth surface 6402 of the mounting component 640 in a spiral direction perpendicular to the inner mounting threads 6403 is less than a height of the first smooth surface 6401 of the mounting component 640 in the spiral direction perpendicular to the inner mounting threads; 6403.

In one embodiment, a sum of the height of the second smooth surface 6402 of the mounting component 640 in the spiral direction perpendicular to the inner mounting threads 6403 and a height of the inner mounting threads 6403 in the spiral direction perpendicular to the inner mounting threads is slightly less than or equal to the height of the first smooth surface 6401 of the mounting component in the spiral direction perpendicular to the inner mounting threads 6403.

The spiral direction of the inner mounting threads 6403 may refer to the spiral direction S1 of the connecting threads 132, which is not described in detail herein.

In one embodiment, the third mounting portion 610$c$ of the faucet body 610 comprises a first body 6101, a second body 6102, a third body 6103, and a fourth body 6104. The first body 6101, the second body 6102, the third body 6103, and the fourth body 6104 are connected in sequence. The first body 6101 is away from the top surface 611 of the faucet body 610, and the fourth body 6104 is away from the bottom surface 612 of the faucet body 610. The first threads 610$c$1 are disposed on an outer surface of the second body 6102. The first smooth surface 6401 of the mounting component 640 is sleeved on an outer surface of the first body 6101. The second smooth surface 6402 of the mounting component 640 is sleeved on an outer surface of the third body 6103 and an outer surface of the fourth body 6104. A diameter of the third body is less than a diameter of the fourth body.

In one embodiment, a diameter of the third body 6103 is less than a diameter of the fourth body 6104, and a diameter of the third body 6103 is less than an outer diameter of the first threads 610$c$1. The first threads 610$c$1, the fourth body 6104, and the third body 6103 jointly define a groove 610$c$2 that is annular, and the groove 610$c$2 may be understood as a transition structure of a threaded connection portion and a non-threaded connection portion in the third mounting portion 610 $c$.

In one embodiment, the second smooth surface 6402 is substantially attached to the fourth body 6104, and the second smooth surface 6402 of the mounting component 640 and the third body 6103 are spaced apart.

In one embodiment, the first smooth surface 6401 of the mounting component 640 is substantially attached to the outer surface of the first body 6101.

In one embodiment, the mounting component 640 is made of metal. Specifically, the mounting ring 6405, the inner mounting threads 6403, and the outer mounting threads 6404 are made of the metal.

As shown in FIGS. 23-25, the faucet body 610 comprises a protrusion 618 extending from the first water outlet channel 615 toward the water inlet channel 614. The first water outlet channel 615 is partially disposed on the protrusion 618. Specifically, one surface of the protrusion 618 facing the first water outlet channel 615 is an arc-shaped surface, and one surface of the protrusion 618 facing the water inlet channel 614 is an arc-shaped surface. In other words, one surface of the protrusion 618 away from the first water outlet channel 615 is an arc-shaped surface, and one surface of the protrusion 618 away from the water inlet channel 614 is an arc-shaped surface.

In one embodiment, the faucet body 610 further comprises a valve core connecting wall 619 disposed around the water inlet channel 614. The valve core connecting wall 619 extends from a bottom wall 610$a$3 of the valve core mounting groove 610$a$2 towards the top surface 611 of the faucet body 610, The valve core connecting wall 619 does not exceed the valve core mounting groove 610$a$2.

The faucet body 610 further comprises a valve core mounting wall (i.e., the first mounting portion 610$a$, or the first mounting portion 610$a$ and the second mounting portion 610$b$, or parts of the first mounting portion 610$a$, the second mounting portion 610$b$ and the third mounting portion 610$c$) surrounds the valve core connecting wall. The valve core mounting wall and the valve core connecting wall 619 are spaced apart to define a gap between the valve core mounting wall and the valve core connecting wall 619.

In one embodiment, the valve core connecting wall 619 defines an opening 6151 of the first water outlet channel 615. In other words, the valve core connecting wall 619 defines the opening 6151, and the opening is an outlet of the first water outlet channel 615.

In one embodiment, the protrusion 618 is disposed on the valve core connecting wall 619, and the protrusion 618 extends towards the water inlet channel 614 relative to the valve core connecting wall 619.

In one embodiment, the single coupled valve body further comprises a water inlet pipe connecting component 630. The water inlet pipe connecting component 630 comprises a connecting ring 631 and connecting threads 632. The connecting ring 631 is hollow. The connecting threads 632 are disposed on an inner surface of the connecting ring 631. The connecting ring 631 is embedded in the faucet body 610. The connecting threads 632 are at least partially located in the water inlet channel 614. One end of the water inlet pipe connecting component 630 away from the bottom surface 612 of the faucet body is adjacent to the protrusion 618.

In one embodiment, the water inlet pipe connecting component 630 is made of the metal. Specifically, the connecting ring 631 and the connecting threads 632 of the water inlet pipe connecting component 630 are both made of the metal.

Specifically, the water inlet pipe connecting component 630 may be referred to the water inlet pipe connecting component 130, and a connection relationship between the water inlet pipe connecting component 630 and the faucet body 610 may also be referred to a connection relationship between the water inlet pipe connecting component 130 and the faucet body 110, which is not repeatedly described in detail herein.

In other optional embodiments, the water inlet pipe connecting component 630 may also be water inlet pipe connecting threads, such as the water inlet pipe connecting threads 330, which is not repeatedly described in detail herein.

In one embodiment, the faucet body 610 further comprises a reinforcing portion 6100 connected to the water inlet pipe connecting component 630. One end of the reinforcing portion 6100 away from the bottom surface 612 of the faucet body 610 is flush with the one end of the water inlet pipe connecting component 630 away from the bottom surface 612 of the faucet body 610. One end of the protrusion 618 away from the top surface 611 of the faucet body 610 is connected to the reinforcing portion 6100.

Figure 26:
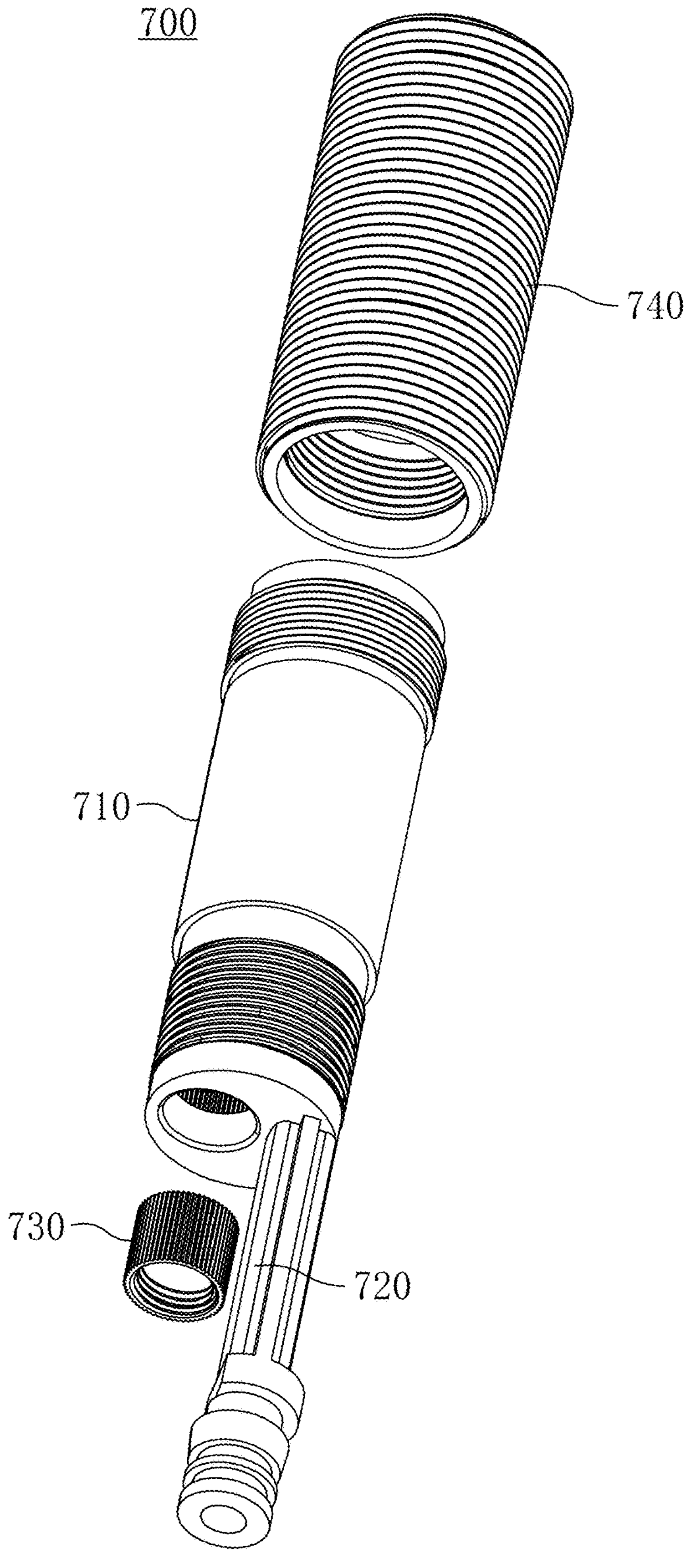
FIG. 26 is an exploded schematic diagram of the single coupled valve body of the faucet according to a seventh embodiment of the present disclosure.

As shown in FIG. 26, the present disclosure provides a single coupled valve body 700 of a faucet.

The single coupled valve body 700 comprises a faucet body 710 and a water outlet pipe 720. A difference between the single coupled valve body 700 and the single coupled valve body 600 comprises that the faucet body 710 does not comprise the second mounting portion 610*b* in the single coupled valve body 600. Other structures of the faucet body 710 may be referred to the faucet body 610, which are not repeatedly described in detail herein.

The water outlet pipe 720 may be referred to the water outlet pipe 720, which is not repeatedly described in detail herein.

Specifically, the single coupled valve body 700 further comprises a water inlet pipe connecting component 730. The water inlet pipe connecting component 730 may be referred to the water inlet pipe connecting component 630, which is not repeatedly described in detail herein.

Specifically, the single coupled valve body 700 further comprises a mounting component 740. The mounting component 740 may be referred to the mounting component 640, which is not repeatedly described in detail herein.

Figure 27:
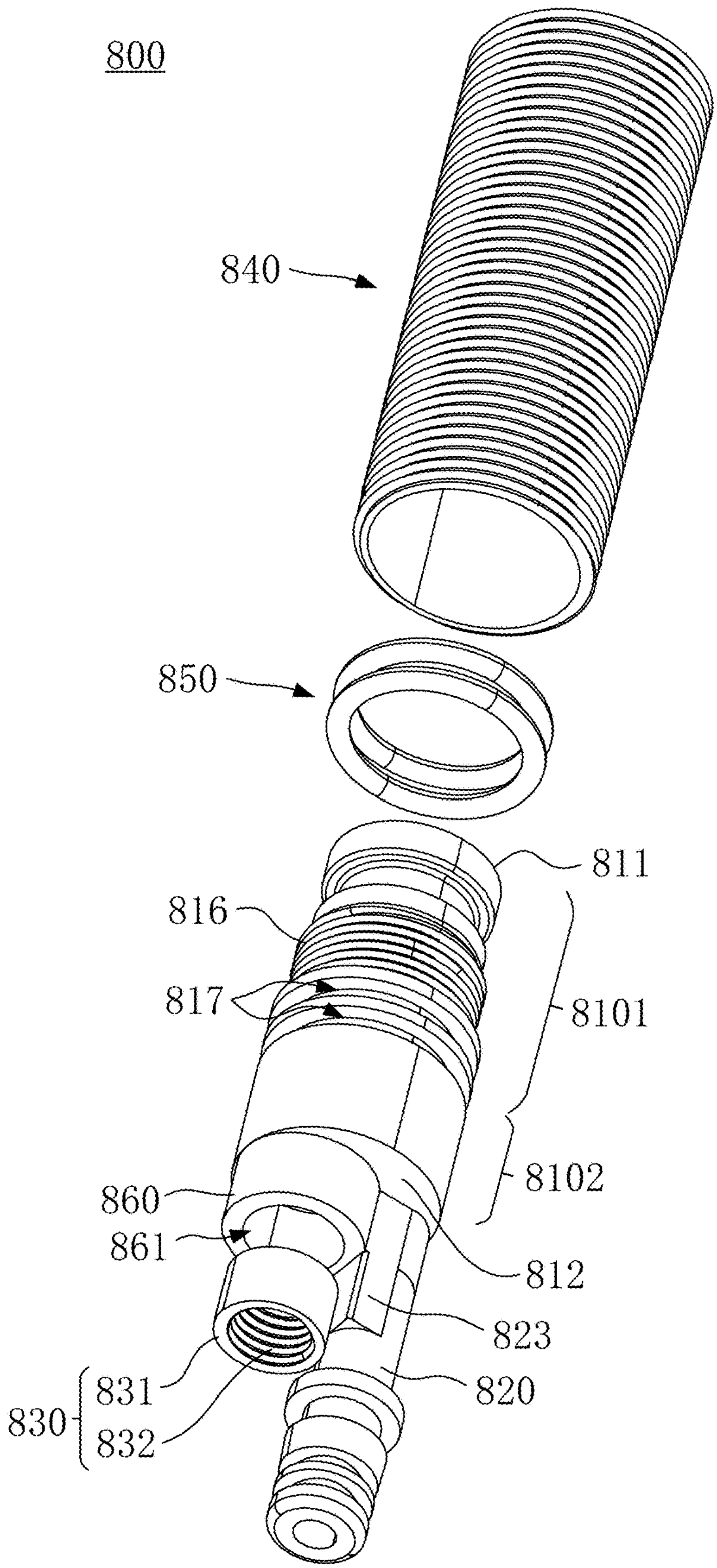
FIG. 27 is an exploded schematic diagram of the single coupled valve body of the faucet according to an eighth embodiment of the present disclosure.
Figure 28:
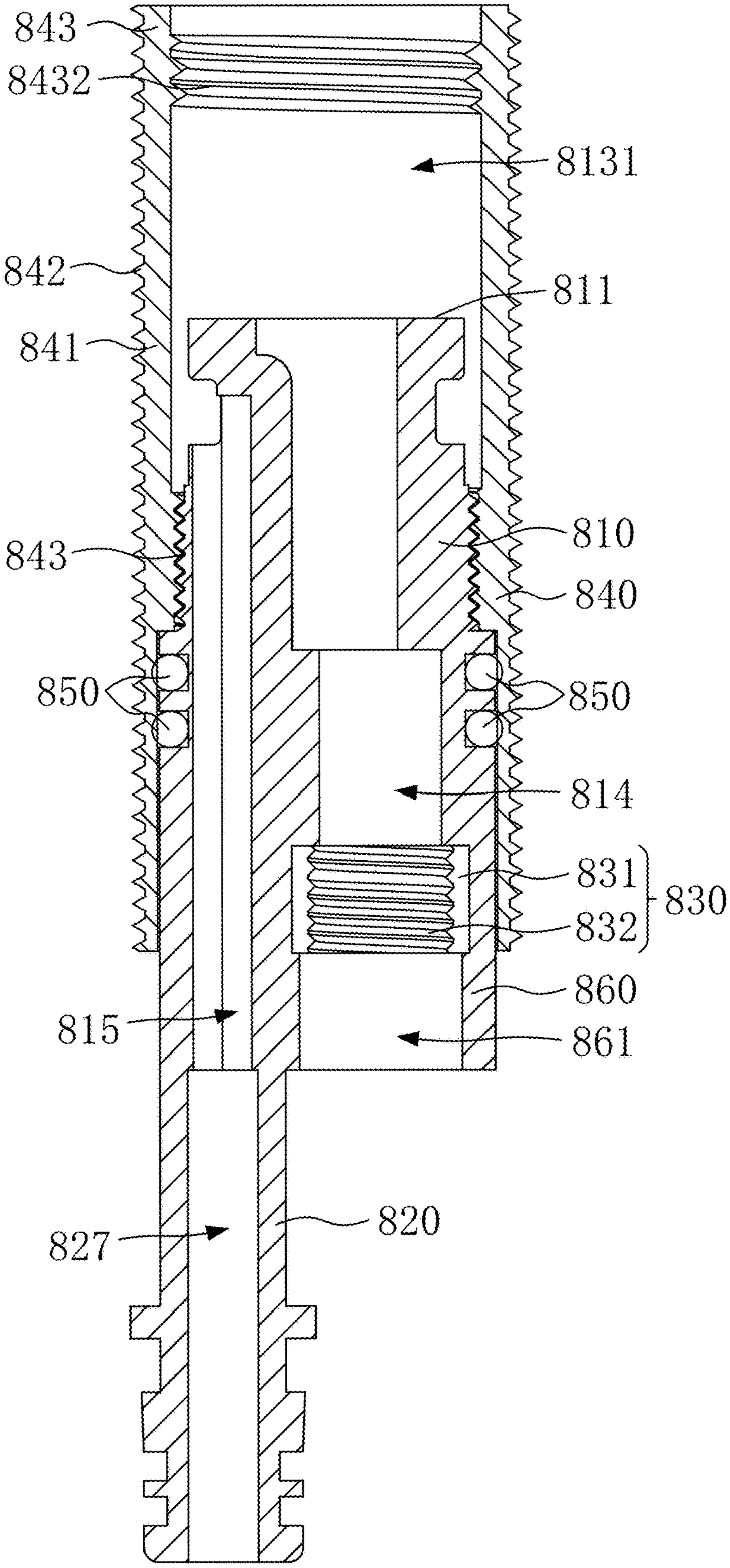
FIG. 28 is a cross-sectional schematic diagram of the single coupled valve body of the faucet according to the eighth embodiment of the present disclosure.
Figure 29:
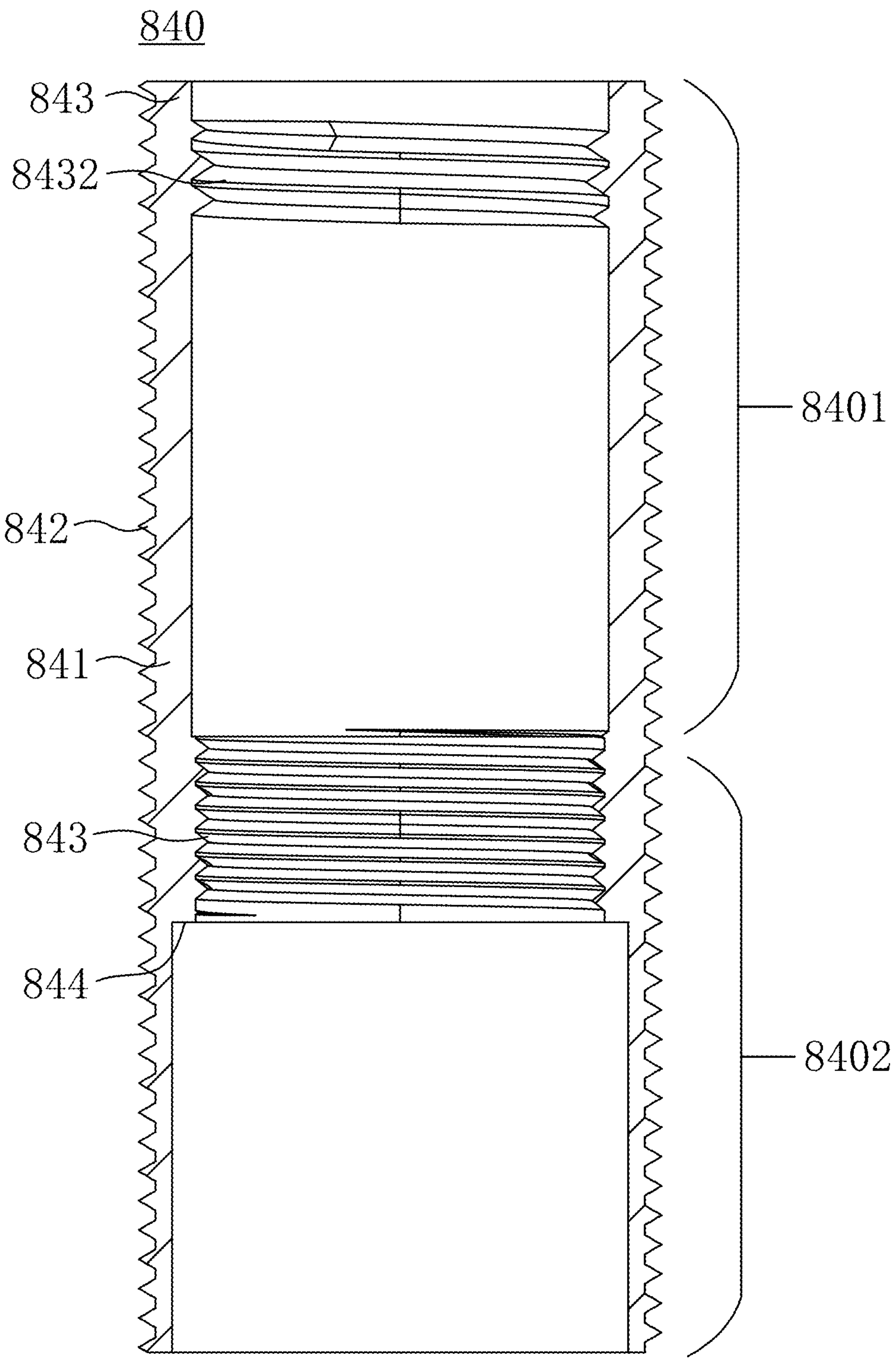
FIG. 29 is a cross-sectional schematic diagram of the mounting component of the single coupled valve body of the faucet according to the eighth embodiment of the present disclosure.

As shown in FIGS. 27-29, the embodiment of the present disclosure provides a single coupled valve body 800. The single coupled valve body 800 comprises a faucet body 810, a water outlet pipe 820, and a mounting component 840. The mounting component 840 is hollow. The faucet body 810 comprises a top surface 811 and a bottom surface 812 opposite to the top surface 811. The water outlet pipe 820 is connected to the bottom surface 812 of the faucet body 810. The faucet body 810 and the water outlet pipe 820 are both made of plastic, and the faucet body 810 and the water outlet pipe 820 are integrally disposed. The faucet body 810 comprises a first water inlet channel 814 and a first water outlet channel 815. The water outlet pipe 820 comprises a second water outlet channel 827 communicated with the first water outlet channel 815.

Specifically, differences between the single coupled valve body 800 and the single coupled valve body 700 are that the mounting component 840 comprises a first mounting portion 8401 and a second mounting portion 8402 connected to first mounting portion 8401, the second mounting portion 8402 is sleeved on an outer surface of the faucet body 810, the first mounting portion 8401 is disposed above the top surface 811 of the faucet body 810. That is, the first mounting portion 8401 protrudes upward from the top surface 811 of the faucet body 810. The first mounting portion 8401 and the top surface 840 of the faucet body 810 jointly define a valve core mounting groove 8131. The valve core mounting groove 8131 may refer to the valve core mounting groove 1131, which is not repeatedly described in detail herein. The mounting component 840 is mounted on the faucet body 810 from the top surface 811 of the faucet body 810. Compared with the prior art in which a mounting component thereof is mounted from a bottom of a conventional faucet body to the conventional faucet body, the embodiment of the present disclosure adopts a different mounting method to realize mounting of the faucet body 810 and the mounting component 840.

In order to increase mounting stability and sealing of the faucet body 810 and the mounting component 840, waterproof rings 850 are disposed between a connection position between the faucet body 810 and the mounting component 840. Optionally, the waterproof rings 850 are disposed on the outer surface of the faucet body 810, specifically, the waterproof rings 850 are sleeved on the outer surface of the faucet body 810 at intervals, and the waterproof rings 850 are attached to the mounting component 840. Specifically, the waterproof rings 850 are attached to the second installation part 8402 fit together.

Specifically, the mounting component 840 comprises a mounting ring 841, outer mounting threads 842 and inner mounting threads 843. The outer mounting threads 842 are disposed on an outer surface of the mounting ring 841, and the inner mounting threads 843 are disposed on an inner surface of the mounting ring 841 and disposed on the second mounting portion 8402. Optionally, the outer mounting threads 842 are disposed on all the outer surface of the mounting ring 841, and the outer mounting threads 842 may refer to the mounting threads 142, which are not repeatedly described herein. The inner mounting threads 843 are disposed on a portion of the second mounting portion 8402. Optionally, the mounting ring 841, the outer mounting threads 842, and the inner mounting threads 843 are made of the metal.

First threads 816 are disposed on the outer surface of the faucet body 810, and the first threads 816 are connected to the inner mounting threads 843. Optionally, the faucet body 810 comprises a first faucet body 8101 and a second faucet body 8102 connected to first faucet body 8101. The top surface 811 of the faucet body 810 is disposed on one end of the first faucet body 8101 away from the second faucet body 8102. The bottom surface 812 of the faucet body 810 is disposed on one end of the second faucet body 8102 away from the first faucet body 8101. A maximum diameter of the first faucet body 8101 is less than a maximum diameter of the second faucet body 8102. The inner surface of the mounting ring 841 is spaced apart from an outer surface of the first faucet body 8101.

Specifically, the first threads 816 are disposed on the outer surface of the first faucet body 8101, and a maximum diameter of the first threads 8101 is less than the maximum diameter of the second faucet body 8102.

Specifically, mounting grooves 817 are defined in an outer surface of the second faucet body 8102. A first part of each of the waterproof rings 850 is mounted in a corresponding one of the mounting grooves 817, and a second part of each of the waterproof rings 850 is exposed on the outer surface of the second faucet body 8102, The waterproof rings 816 are attached to the inner surface of the mounting ring 841.

Correspondingly, a thickness of a portion of the mounting ring 841 disposed on a position provided with the inner mounting threads 843 of the second mounting portion 8402 is greater than a thickness of a portion of the mounting ring 841 disposed on a position without the inner mounting threads 843 of the second mounting portion 8402, so as to form a step structure 844 at the connection position therebetween. A thickness of a portion of the mounting ring 841 disposed on the first mounting portion 8401 is greater than the thickness of the portion of the mounting ring 841 disposed on the position without the inner mounting threads 843 of the second mounting portion 8402.

Specifically, the waterproof rings 850 are disposed between the bottom surface 812 of the faucet body 810 and the first threads 816, and the waterproof rings 850 are closer to the bottom surface 812 of the faucet body 810 than the top surface 811 of the faucet body 810. The first threads 816 are closer to the top surface 811 of the faucet body 810 than the bottom surface 812 of the faucet body 810.

Specifically, the mounting component 840 further comprises valve core mounting threads 8432 disposed on the first mounting portion 8401. The valve core mounting threads 8432 is further disposed on the inner surface of the mounting ring 841. The first mounting portion 8401 is further served as a valve core mounting wall 8401 configured to mount a valve core.

Specifically, the bottom surface 812 of the faucet body 810 is flush with one end of the second mounting portion 8402 away from the first mounting portion 8401.

The differences between the single coupled valve body 800 and the single coupled valve body 100 further comprise that the single coupled valve body 800 comprises a water inlet extension pipe 860. The water inlet extension pipe 860 is disposed on the bottom surface 812 of the faucet body 810. The water inlet extension pipe 860 comprises a second water inlet channel 861 communicated with the first water inlet channel 814. The water inlet extension pipe 860 is connected to the water outlet pipe 820. Optionally, the water inlet extension pipe 860 is made of plastic. The faucet body 810, the water outlet pipe 820, and the water inlet extension pipe 860 are integrally disposed.

Specifically, an outer surface of the water inlet extension pipe 860 is arc-shaped, an outer surface of the water outlet pipe 820 is arc-shaped, and the water inlet extension pipe 860 is directly connected to the water outlet pipe 820. Two sides of a connection position of the water inlet extension pipe 860 and the water outlet pipe 820 are also connected with a reinforcement structure 823.

Optionally, the single coupled valve body 800 further comprises a water inlet pipe connecting component 830. The water inlet pipe connecting component 830 comprises a connecting ring 831 and connecting threads 832. The connecting ring 831 is hollow, and the connecting threads 832 are disposed on an inner surface of the connecting ring 831. The connecting ring 831 is embedded in the faucet body 810, and the connecting threads 832 are at least partially disposed in the first water inlet channel 814.

Optionally, the water inlet pipe connecting component 830 is made of the metal. For instance, the connecting ring 831 and the connecting threads 832 of the water inlet pipe connecting component 830 are made of the metal.

Optionally, the water inlet pipe connecting component 830 may refer to the water inlet pipe connecting component 130, and a connection relationship between the water inlet pipe connecting component 830 and the faucet body 810 may also refer to a connection relationship between the water inlet pipe connecting component 130 and the faucet body 110, which is not repeatedly described herein.

In other optional embodiments, the water inlet pipe connecting component 830 may be water inlet pipe connecting threads, such as the water inlet pipe connecting threads 330, which are not repeatedly described herein.

The above embodiments of the present disclosure provide a detailed illustration to the single coupled valve body. In the present disclosure, specific embodiments are applied to illustrate the principles and implementations of the present disclosure. The above description of the embodiments is only used to better understand methods and core ideas of the present disclosure. Meanwhile, according to the ideas of the present disclosure, changes are made in the specific implementations and the disclosure scope by those skilled in the art. Therefore, the contents of the specification should not be regarded as a limitation of the present disclosure.

What is claimed is:

1. A valve body of a faucet, comprising:

a body;

a water outlet pipe; and a mounting component configured to housing the body;

wherein the mounting component defines a hollow cavity surrounding an outer surface of the body, the body defines a first water inlet channel and a first water outlet channel, wherein both of the first water inlet channel and the first water outlet channel are in communication with the hollow cavity;

wherein the water outlet pipe is extended from the body, the water outlet pipe comprises a second water outlet channel communicated with the first water outlet channel, both of the body and the water outlet pipe are made of plastic, and the body and the water outlet pipe are integrally disposed;

wherein the valve body further comprises a water inlet pipe connecting component, the water inlet pipe connecting component comprises a connecting ring, at least one connecting structure protrudes from an outer surface of the connecting ring, when the connecting ring is connected to an inner surface of the water inlet channel, the at least one connecting structure is positioned between the inner surface of the water inlet channel and the outer surface of the connecting ring.

2. The valve body according to claim 1, wherein the first water inlet channel and the first water outlet channel penetrate through a bottom surface of the body, at least one of the first water inlet channel and the first water outlet channel penetrates a top surface of the body.

3. The valve body according to claim 1, wherein an outer surface of the body defines an opening, at least one of the first water inlet channel and the first water outlet channel is in communication with the hollow cavity through the opening.

4. The valve body according to claim 3, wherein the body comprises a valve core connecting wall disposed around the first water inlet channel, and the opening is defined in the valve core connecting wall, the first water outlet channel is in communication with the hollow cavity through the opening.

5. The valve body according to claim 1, wherein the mounting component comprises a first mounting portion and a second mounting portion connected to the first mounting portion, the second mounting portion is sleeved on an outer surface of the body, the first mounting portion is disposed above a top surface of the body, and the first mounting portion and the top surface of the body jointly define a valve core mounting groove.

6. The valve body according to claim 5, the mounting component further comprises valve core mounting threads, and the valve core mounting threads are disposed on an inner surface of the first mounting portion.

7. The valve body according to claim 5, wherein a bottom surface of the body is flush with that of the second mounting portion.

8. The valve body according to claim 5, wherein the mounting component comprises a mounting ring, outer mounting threads, and inner mounting threads, wherein the outer mounting threads are disposed on an outer surface of the mounting ring, the inner mounting threads are disposed on an inner surface of the mounting ring, and the inner mounting threads are disposed on the second mounting portion;

wherein first threads are disposed on the outer surface of the body, and the first threads are connected to the inner mounting threads.

9. The valve body according to claim 8, wherein the mounting ring, the outer mounting threads, and the inner mounting threads are made of metal.

10. The valve body according to claim 8, wherein the body comprises a first faucet body and a second faucet body connected to the first faucet body, the top surface of the body is defined on one end of the first faucet body away from the second faucet body, a bottom surface of the body is defined on one end of the second faucet body away from the first faucet body, a maximum diameter of the first faucet body is less than a maximum diameter of the second faucet body, and the inner surface of the mounting ring is spaced apart from an outer surface of the first faucet body;

wherein the first threads are disposed on the outer surface of the first faucet body, and a maximum diameter of the first threads is less than the maximum diameter of the second faucet body.

11. The valve body according to claim 1, the valve body further comprising at least one waterproof ring; wherein the at least one waterproof ring is disposed on the outer surface of the body and attached to an inner surface of the mounting component.

12. The valve body according to claim 11, wherein mounting grooves are defined in an outer surface of the body, a first part of each waterproof ring is mounted in a corresponding one of the mounting grooves, a second part of each waterproof ring is exposed on the outer surface of the body, and the waterproof rings are attached to an inner surface of the mounting ring.

13. The valve body according to claim 1, wherein the water inlet pipe connecting component further comprises connecting threads, the connecting threads are disposed on an inner surface of the connecting ring, the connecting threads are at least partially located in the first water inlet channel; wherein the connecting ring and the connecting threads are made of metal.

14. The valve body according to claim 1, wherein the at least one connecting structure comprises at least two connecting structures, the at least two connecting structures are disposed on the outer surface of the connecting ring at intervals.

15. The valve body according to claim 13, wherein the at least one connecting structure comprises connecting bars, the connecting bars extend in an axis direction of the connecting ring; wherein an extending direction of the connecting bars is roughly perpendicular to a spiral direction of the connecting threads.

16. The valve body according to claim 15, wherein the at least one connecting structure comprises connecting groups, each of the connecting groups comprises the connecting bars, the connecting bars of each of the connecting groups are disposed at intervals around the outer surface of the connecting ring, and the connecting groups are disposed at equal intervals along the axis direction of the connecting ring.

17. The valve body according to claim 16, wherein the connecting groups comprise a first connecting group, a second connecting group, and a third connecting group; wherein the first connecting group, the second connecting group, and the third connecting group are sequentially disposed along the axis direction of the connecting ring;

wherein the connecting bars in the first connecting group are connected to an edge of a first end of the connecting ring, each of the connecting bars in the first connecting group comprises a first portion and a second portion connected to the first portion, one end of each first portion away from a corresponding second portion is connected to the edge of the first end of the connecting ring, and each first portion is obliquely disposed with respect to the edge of the first end of the connecting ring;

wherein the connecting bars in the third connecting group are connected to an edge of a second end of the connecting ring, each of the connecting bars in the third connecting group comprises a third portion and a fourth portion connected to the third portion, one end of each third portion away from a corresponding fourth portion is connected to the edge of the second end of the connecting ring, and each third portion is obliquely disposed with respect to the edge of the second end of the connecting ring.

18. The valve body according to claim 17, wherein the first connecting group and the third connecting group are symmetrically disposed with respect to the second connecting group.

19. The valve body according to claim 1, wherein the valve body further comprises a water inlet extension pipe disposed on a bottom surface of the body, the water inlet extension pipe comprises a second water inlet channel communicated with the first water inlet channel, and the water inlet extension pipe is connected to the water outlet pipe; wherein the water inlet extension pipe is made of the plastic, and the body, the water outlet pipe, and the water inlet extension pipe are integrally disposed.

* * * * *